(12) United States Patent
Roberts

(10) Patent No.: US 10,391,699 B2
(45) Date of Patent: *Aug. 27, 2019

(54) RECYCLABLE PLASTIC STRUCTURAL ARTICLES AND METHOD OF MANUFACTURE

(71) Applicant: Richard W. Roberts, Tecumseh, MI (US)

(72) Inventor: Richard W. Roberts, Tecumseh, MI (US)

( * ) Notice: Subject to any disclaimer, the term of this patent is extended or adjusted under 35 U.S.C. 154(b) by 716 days.

This patent is subject to a terminal disclaimer.

(21) Appl. No.: 14/389,021

(22) PCT Filed: Mar. 28, 2013

(86) PCT No.: PCT/US2013/034295
§ 371 (c)(1),
(2) Date: Sep. 29, 2014

(87) PCT Pub. No.: WO2013/148962
PCT Pub. Date: Oct. 3, 2013

(65) Prior Publication Data
US 2015/0064379 A1    Mar. 5, 2015

Related U.S. Application Data

(63) Continuation-in-part of application No. 13/463,715, filed on May 3, 2012, now abandoned, and a
(Continued)

(51) Int. Cl.
*B29C 49/42*    (2006.01)
*B32B 1/08*    (2006.01)
(Continued)

(52) U.S. Cl.
CPC .......... *B29C 49/4273* (2013.01); *B29C 44/18* (2013.01); *B29C 44/343* (2013.01);
(Continued)

(58) Field of Classification Search
CPC .............. B29C 44/343; B29C 49/4273; B29C 2049/4691
See application file for complete search history.

(56) References Cited

U.S. PATENT DOCUMENTS 776,342 A    11/1904    McCormick
1,588,778 A    6/1926    Sorensen
(Continued)

FOREIGN PATENT DOCUMENTS

EP    0542302    5/1993
EP    0583542    2/1994
(Continued)

OTHER PUBLICATIONS

GB Examination Report for GB 1308511.3, Completed by the GB Patent Office, dated Aug. 10, 2016, 5 pages.
(Continued)

*Primary Examiner* — Atul P. Khare
(74) *Attorney, Agent, or Firm* — Brooks Kushman P.C.

(57) ABSTRACT

The plastic structural article includes an elongated tubular shell having opposed end sections, a middle section there between and an interior cavity. The interior cavity has a foam core situated therein. The foam core comprises steam expandable polymer beads which when expanded substantially fill the interior cavity. The bead and shell are of a similar plastic composition enabling the articles to be reground and recycled. An apparatus for forming the articles and an associated method of manufacture are also disclosed. A thermal management system includes a panel having a periphery, and a skin having a thermal bond to an in-situ foam core. The panel has a thermal transmittance u-value ranging from 0.1 to 0.17 W/m²° C.

13 Claims, 35 Drawing Sheets

Related U.S. Application Data continuation-in-part of application No. 13/463,738, filed on May 3, 2012, now abandoned, and a continuation-in-part of application No. 13/840,827, filed on Mar. 15, 2013, now Pat. No. 9,346,237.

(60) Provisional application No. 61/617,045, filed on Mar. 29, 2012, provisional application No. 61/617,047, filed on Mar. 29, 2012.

(51) Int. Cl.

| | | |
|---|---|---|
| *B29C 49/04* | (2006.01) | |
| *E01B 3/44* | (2006.01) | |
| *E01B 9/36* | (2006.01) | |
| *E01F 9/588* | (2016.01) | |
| *B29C 44/34* | (2006.01) | |
| *B29C 49/78* | (2006.01) | |
| *B29C 44/18* | (2006.01) | |
| *B29C 44/44* | (2006.01) | |
| *B29C 49/28* | (2006.01) | |
| *B32B 27/06* | (2006.01) | |
| *B32B 27/08* | (2006.01) | |
| *B32B 27/32* | (2006.01) | |
| *B32B 3/04* | (2006.01) | |
| *E01F 9/529* | (2016.01) | |
| *B29C 49/00* | (2006.01) | |
| *B29C 49/58* | (2006.01) | |
| *B29C 49/46* | (2006.01) | |
| *B29K 105/04* | (2006.01) | |
| *B29C 49/60* | (2006.01) | |
| *B29L 31/06* | (2006.01) | |
| *B29K 23/00* | (2006.01) | |
| *B29K 25/00* | (2006.01) | |
| *B29K 101/00* | (2006.01) | |
| *B29K 501/00* | (2006.01) | |
| *B29L 31/10* | (2006.01) | |

(52) U.S. Cl.
CPC ........ *B29C 44/445* (2013.01); *B29C 49/0005* (2013.01); *B29C 49/04* (2013.01); *B29C 49/28* (2013.01); *B29C 49/58* (2013.01); *B29C 49/78* (2013.01); *B32B 1/08* (2013.01); *B32B 3/04* (2013.01); *B32B 27/065* (2013.01); *B32B 27/08* (2013.01); *B32B 27/32* (2013.01); *E01B 3/44* (2013.01); *E01B 9/36* (2013.01); *E01F 9/529* (2016.02); *E01F 9/588* (2016.02); *B29C 44/3426* (2013.01); *B29C 2049/4691* (2013.01); *B29C 2049/6072* (2013.01); *B29C 2949/78025* (2013.01); *B29C 2949/78294* (2013.01); *B29K 2023/06* (2013.01); *B29K 2023/12* (2013.01); *B29K 2025/06* (2013.01); *B29K 2101/00* (2013.01); *B29K 2105/04* (2013.01); *B29K 2105/048* (2013.01); *B29K 2501/00* (2013.01); *B29L 2031/06* (2013.01); *B29L 2031/10* (2013.01); *B32B 2266/025* (2013.01); *B32B 2270/00* (2013.01); *Y10T 428/1372* (2015.01); *Y10T 428/1376* (2015.01)

(56) References Cited

U.S. PATENT DOCUMENTS

| | | |
|---|---|---|
| 2,292,369 A | 8/1942 | Gordon |
| 2,784,417 A | 3/1957 | Strand |
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |
| 3,563,845 A | 2/1971 | Stevens |
| 3,598,312 A | 8/1971 | Hamilton |
| 3,745,998 A | 7/1973 | Rose |
| 3,774,968 A | 11/1973 | Fenton |
| 3,813,040 A | 5/1974 | Heinemeyer |
| 3,935,044 A | 1/1976 | Daly |
| 4,361,656 A | 11/1982 | Mostafa |
| 4,457,729 A | 7/1984 | Peerlkamp |
| 4,492,663 A | 1/1985 | Reinfeld et al. |
| 4,546,899 A | 10/1985 | Williams |
| 4,573,741 A | 3/1986 | Kirchner-Carl |
| 4,621,002 A | 11/1986 | Kuhlmann et al. |
| 4,651,494 A | 3/1987 | Van Wagoner |
| 4,680,909 A | 7/1987 | Stewart |
| 4,762,438 A | 8/1988 | Dewing |
| 4,825,089 A | 4/1989 | Lindsay |
| 4,840,973 A | 6/1989 | Kuwabara et al. |
| 4,961,715 A | 10/1990 | Shanelec |
| 5,018,329 A | 5/1991 | Hasan et al. |
| 5,023,042 A | 6/1991 | Efferding |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,275,860 A | 1/1994 | D'Luzansky et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,580,621 A | 12/1996 | Kuszaj et al. |
| 5,624,517 A | 4/1997 | Giesen et al. |
| 5,665,285 A | 9/1997 | Hattori et al. |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A | 7/1998 | Slaven |
| 5,824,261 A | 10/1998 | Berdan |
| 5,858,159 A | 1/1999 | Holbrook et al. |
| 5,866,224 A | 2/1999 | Ang et al. |
| 5,956,905 A | 9/1999 | Weidrich |
| 6,086,145 A | 7/2000 | Wandyez |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,286,879 B1 | 9/2001 | Haque et al. |
| 6,375,892 B2 | 4/2002 | Thomas |
| 6,605,343 B1 | 8/2003 | Motoi et al. |
| 6,607,680 B1 | 8/2003 | Moitzheim |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,955,576 B2 | 10/2005 | Yeh |
| 6,972,144 B2 | 12/2005 | Roth et al. |
| 7,201,112 B2 | 4/2007 | Jolley |
| 7,201,625 B2 | 4/2007 | Yeh |
| 7,219,479 B2 | 5/2007 | Durning et al. |
| 7,358,280 B2 | 4/2008 | Berghmans et al. |
| 7,377,828 B2 | 5/2008 | Cheung |
| 7,401,998 B2 | 7/2008 | Wilson et al. |
| 7,485,352 B2 | 2/2009 | Yuasa et al. |
| 7,537,413 B1 | 5/2009 | Brugos |
| 7,670,202 B2 | 3/2010 | Yeh |
| 7,931,210 B1 | 4/2011 | Pike et al. |
| 7,950,592 B2 | 5/2011 | Yuan |
| 7,976,749 B2 | 7/2011 | Volkel et al. |
| 8,181,288 B1 | 5/2012 | Davis, Jr. |
| 2001/0035658 A1 | 11/2001 | Anderson et al. |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0209828 A1 | 11/2003 | Nohara et al. |

(56) References Cited

U.S. PATENT DOCUMENTS

| | | |
|---|---|---|
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0003044 A1 | 1/2006 | Dinello et al. |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2007/0180847 A1 | 8/2007 | Schabron et al. |
| 2008/0018161 A1 | 1/2008 | Evans |
| 2008/0048462 A1 | 2/2008 | Zabik |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0275148 A1 | 11/2008 | Tokiwa et al. |
| 2008/0305304 A1 | 12/2008 | Yeh |
| 2009/0011667 A1 | 1/2009 | Hayward et al. |
| 2009/0100780 A1 | 4/2009 | Mathis et al. |
| 2009/0133354 A1 | 5/2009 | Spear et al. |
| 2010/0028654 A1 | 2/2010 | Takase et al. |
| 2010/0116180 A1 | 5/2010 | Roth et al. |
| 2011/0115120 A1 | 5/2011 | Hattori et al. |
| 2011/0180959 A1 | 7/2011 | Donnelly et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0240451 A1 | 9/2012 | Ricks |
| 2012/0328889 A1 | 12/2012 | Hayashi et al. |
| 2013/0140860 A1 | 6/2013 | Naughton et al. |
| 2013/0175725 A1 | 7/2013 | Tokiwa et al. |
| 2014/0075666 A1 | 3/2014 | Campbell et al. |
| 2015/0064379 A1 | 3/2015 | Roberts |

FOREIGN PATENT DOCUMENTS

| | | | |
|---|---|---|---|
| EP | 0535147 | 9/1996 | |
| EP | 1987934 | 11/2008 | |
| JP | 58213028 | 12/1983 | |
| JP | S59145125 | 8/1984 | |
| JP | 59155443 | 9/1984 | |
| JP | 59210954 | 11/1984 | |
| JP | 60090744 | 5/1985 | |
| JP | 06166112 | 6/1994 | |
| JP | 07195536 | 8/1995 | |
| JP | 07195536 A * | 8/1995 | ............ B29C 49/60 |
| JP | 2010046920 | 3/2010 | |
| WO | 9119867 | 12/1991 | |
| WO | 2008121754 | 10/2008 | |
| WO | 2011103284 | 8/2011 | |

OTHER PUBLICATIONS

Partial Supplementary European Search Report for European Application No. 13769879.1, Completed by the European Patent Office, dated Nov. 11, 2015, 9 pages.

Website www.jsp.com, 2006, "Arplank, Expanded bead foam packaging materials, Material Properties, Auto/Mil Specs." 21 Pages.

Website, Manning, www.mmh.com Oct. 2008, Retrieved on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

Vehicle Certification Agency Oct. 25, 2007, pp. 1-6, Test Report No. ESH178571, "Test Report: Seat Strength.".

ECE Agreement Jul. 31, 2002, Regulation No. 17, "Concerning the adoption of uniform technical prescriptions for wheeled vehicles, equipment and parts which can be fitted and / or used on wheeled vehicles and the conditions for reciprocal recognition of approvals granted on the basis of these prescriptions.".

International Search Report for PCT/US2013/034295, Completed by the Korean Intellectual Property Office dated Jul. 24, 2013, 4 pages.

National Highway Traffic Safety Admin., DOT. 49 C.F.R. § Part 581, Undated.

Extended European Search Report for European Application No. EP 13769879.1, Completed by the European Patent Office, dated May 11, 2016, 20 pages.

* cited by examiner

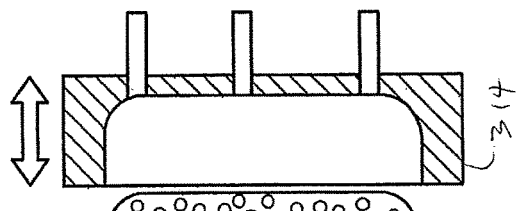
*Fig. 15I*
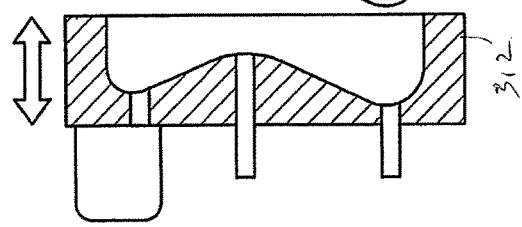
*Fig. 15H*
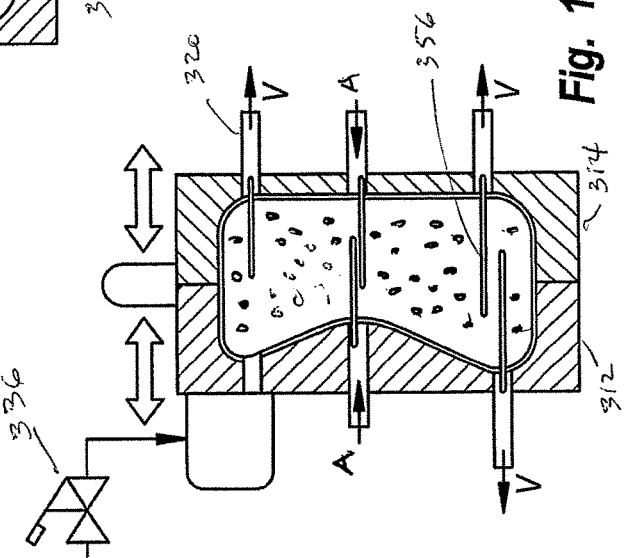
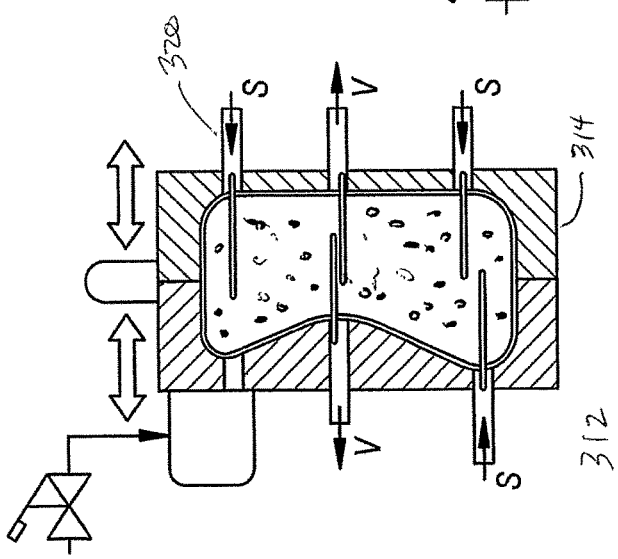
*Fig. 15G*

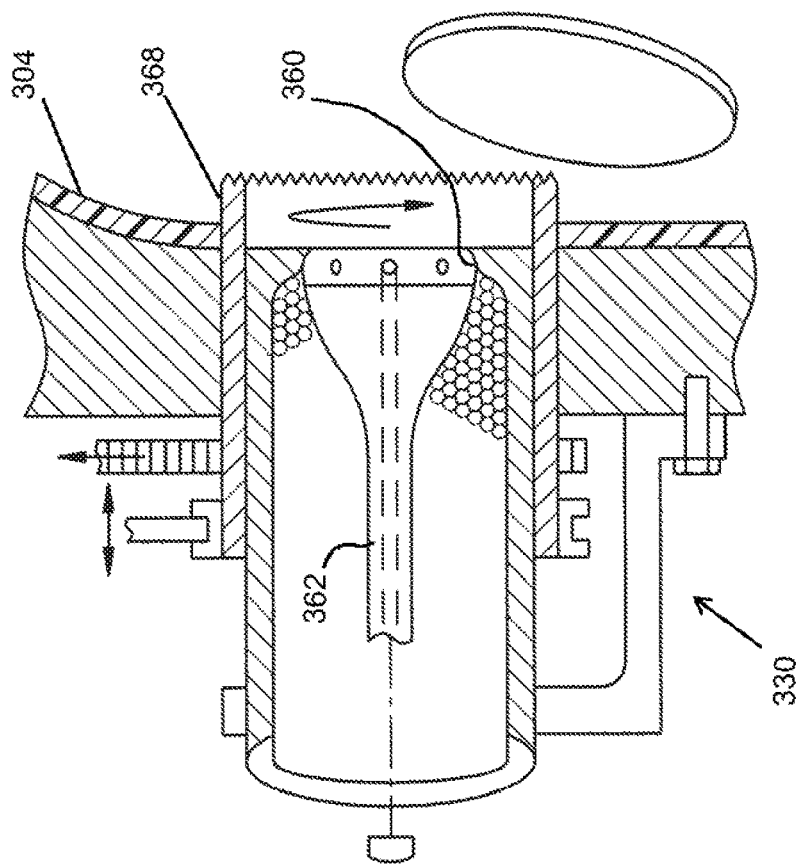
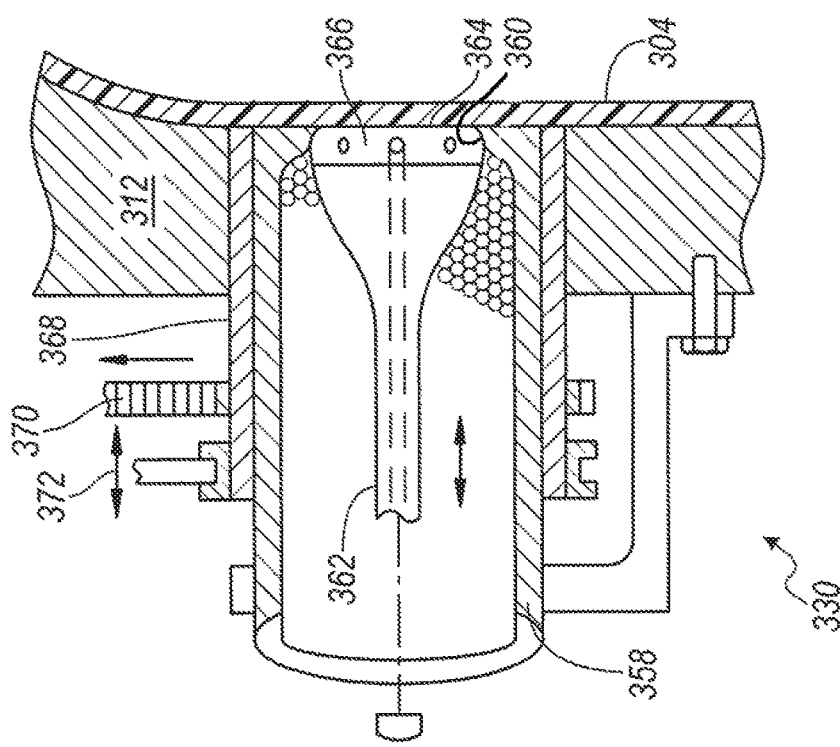

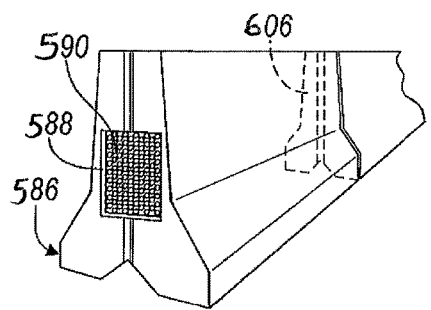
FIG. 32
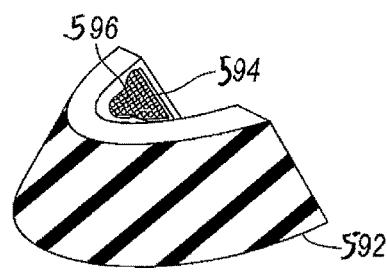
FIG. 33
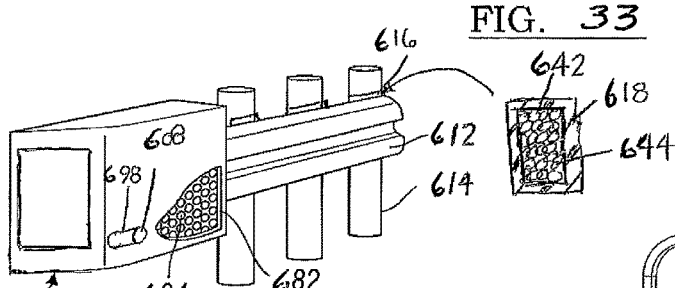
FIG. 34
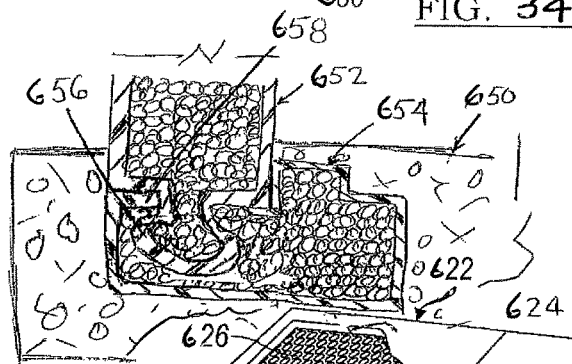
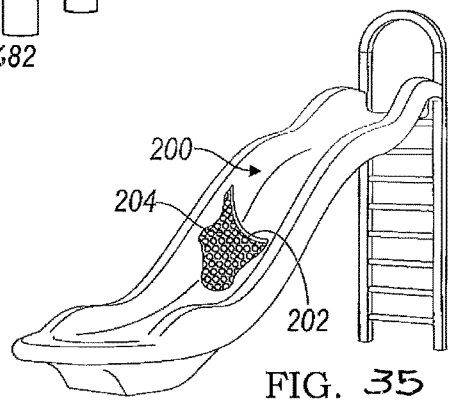
FIG. 35
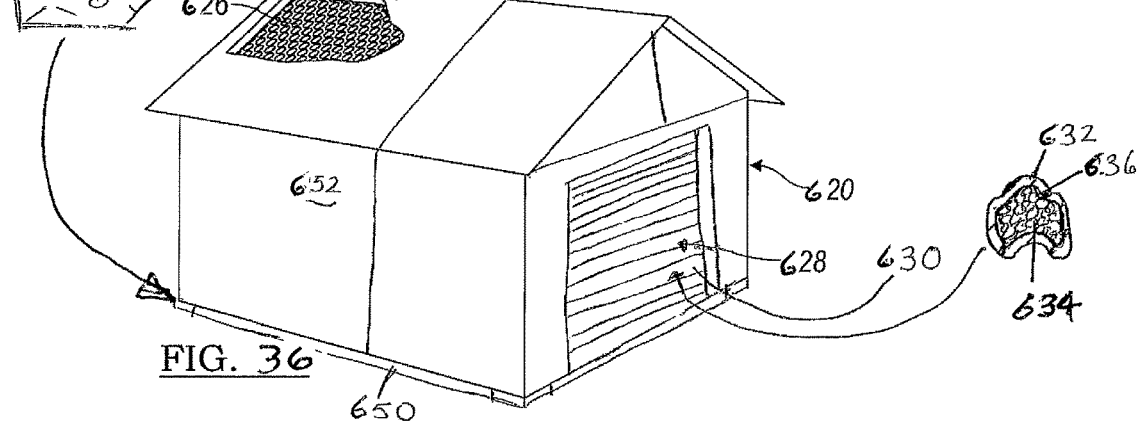
FIG. 36

RECYCLABLE PLASTIC STRUCTURAL ARTICLES AND METHOD OF MANUFACTURE

CROSS-REFERENCE TO RELATED APPLICATION

This application is the U.S. national phase of PCT Application No. PCT/US2013/034295 filed on Mar. 28, 2013, which claims benefit of 61/617,047 filed Mar. 29, 2012 and benefit of 61/617,045 filed Mar. 29, 2012, and is a continuation-in-part of 13/463,715 filed May 3, 2012, now abandoned, and is a continuation-in-part of 13/840,827 filed Mar. 15, 2013, now issued as U.S. Pat. No. 9,346,237 the disclosures of which are incorporated in their entirety by reference herein.

TECHNICAL FIELD

The disclosed embodiments relate to recyclable plastic structural articles having a skin layer and an expanded foam bead core bonded thereto and methods of manufacture of same.

BACKGROUND

Substitution of plastic compositions for structural articles formed from non-plastic materials may meet objections regarding relatively low physical properties of the substitute plastic composition. Manufacturers often blend the plastic composition with other resins and additives to improve the physical properties. But, the blends of resins and additives may decrease the recyclability of the plastic composition.

In one example of a structural article suitable for material substitution, railroad ties support relatively great weights of railroad locomotives and their attached train cars with their contents. As the trains pass over railroad rails supported on railroad ties, the ties experience substantial vibration, in addition to the compressive force of the weight. When the ties are not in use, they are still subjected to harsh environment extremes of temperature, ultraviolet light, and moisture. The degradation of wooden railroad ties through this exposure to the environment requires that the ties must be replaced frequently in order to continue to perform their primary function of supporting the weight of the train. The wood used to make conventional railroad ties is increasingly becoming more expensive. Wooden railroad ties are heavy making the job of replacing them difficult.

Articles currently available and not an incorporating in-situ foam core have various deficiencies with regard to absorbing water, management of energy, lack of structure, excessive weight, or biological degradation Manufacturers attempt to insulate an internal cavity of an article from the external environment. It is advantageous to have minimal thermal transfer between the internal cavity in the external environment. It is also advantageous to have the walls of the energy management system be as structural and as light as possible as well as economical. Adding more insulation increases the cost and weight of the energy management system article.

Certain manufacturers of energy management system articles use processes such as blow molding or vacuum forming followed by costly secondary operation of filling the cavity formed by the molding process with an injected foam, such as polyurethane foam. Other manufacturers of energy management system articles, such as refrigerators, have a large number of individual subcomponents, many of which involve bending of sheet metal, followed by secondary operations of filling the cavity formed by the subcomponents with injected foam.

SUMMARY

Disclosed embodiments relate to recyclable plastic structural articles having a skin layer and an expanded foam bead core bonded thereto and methods of manufacture of same. In at least one embodiment, a plastic structural article includes an elongated tubular shell having opposed end sections, a middle section therebetween and an interior cavity. The article also includes a foam core comprised of steam expandable polymer beads which when expanded substantially fill the interior cavity.

The article in another embodiment, includes a railroad tie having an elongated shell including opposed closed end sections and a middle section therebetween. The shell defines an elongate interior cavity. Substantially filling the cavity is a foam core comprising expanded polyolefin beads.

In yet another embodiment, a method of manufacturing a plastic structural article includes blow-molding a plastic preform in a mold cavity in the shape of an elongated member to form an elongated tubular plastic shell. The shell has opposed end sections, a middle section therebetween and a hollow interior cavity. The method also includes forming at least one fill port and a plurality of heating ports in the wall of the plastic shell. The shell interior cavity is filled with expandable polymer beads. The polymer beads are expanded by injecting a hot, at least partially vaporized, heating medium into the heating ports. The polymer beads expand so as to substantially fill the interior cavity of the shell. The plastic shell is constrained to limit expansion of the shell caused by the heated expanding polymer beads until the assembly is sufficiently cooled to limit substantial further expansion. The mold cavity is opened releasing the plastic structural article.

A plastic article is recited having a plastic shell including walls defining a cavity. Within the cavity is an in-situ foam core including expanded polymer beads. A layer of the expanded polymer beads includes a layer of distorted beads. The in-situ form core has a thermal bond to the walls.

In at least one embodiment, a thermal management system includes a panel having a periphery and a skin having a thermal bond to an in-situ foam core. The panel has a thermal transmission U-value ranging from 0.1 to 0.17 $W/m^{2\circ} C$.

BRIEF DESCRIPTION OF THE DRAWINGS

FIGS. 15a-15i schematically illustrate a more detailed process of the manufacture of a foam filled blow molded article;

FIGS. 16a-16d illustrate a bead filled gun in various states of operation;

FIG. 32-34 schematically illustrates in an isometric view of highway bumper systems according to at least one embodiment;

FIG. 35 schematically illustrates an isometric view of a playground slide according to at least one embodiment;

FIG. 36 schematically illustrates an isometric view of a storage shed according to at least one embodiment;

DETAILED DESCRIPTION

Figure 1:
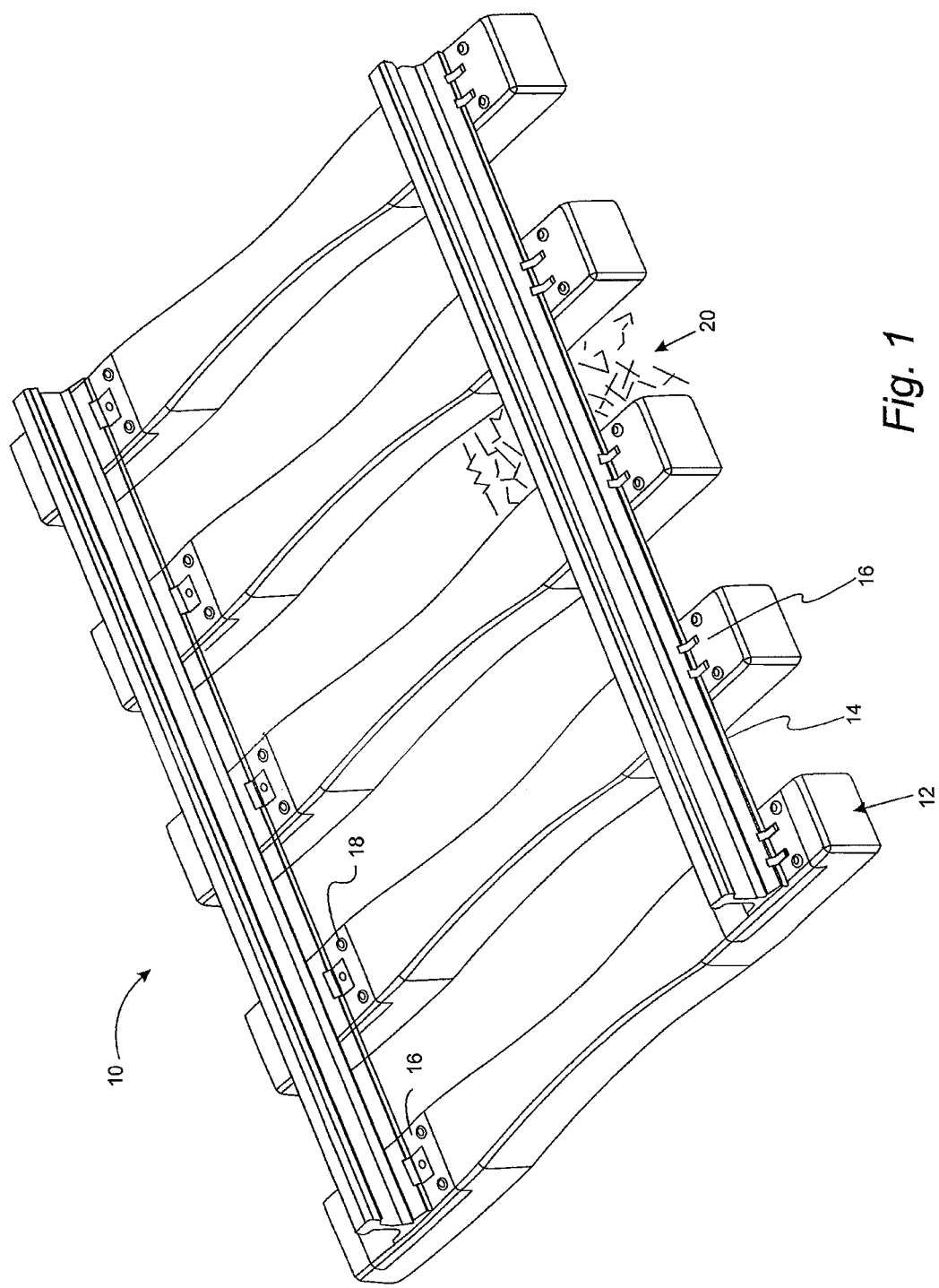
FIG. 1 schematically illustrates a fragmentary isometric view of a rail pattern according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "ter-polymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

Regarding FIG. 1, a section of railroad track is shown having a rail pattern 10 comprising two lengths of a railroad rail 14 that supports a maximum length of a span of a railroad car or locomotive from truck to truck. In at least one embodiment, rail pattern 10 comprises 5 to 50 railroad ties 12. In another embodiment, rail pattern 10 comprises 20 to 35 railroad ties 12. In yet another embodiment, rail pattern 10 comprises 25 to 32 railroad ties 12.

In at least one embodiment, rail pattern 10 includes railroad ties 12 situated on a rail bed 20. Ties 12 support at least two rails 14 which are parallel and spaced apart. Rail 14 is connected to railroad tie 12 with a plate 16 connected to rail 14. Plate 16 is fastened to railroad tie 12 by one or more spikes 18.

Figure 2:
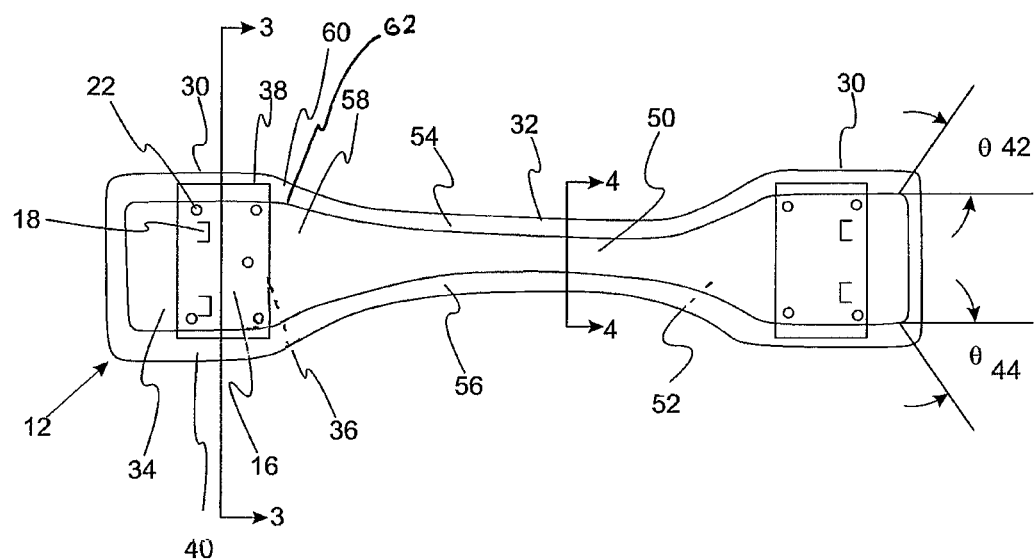
FIG. 2 schematically illustrates a railroad tie according to at least one embodiment.
Figure 3:
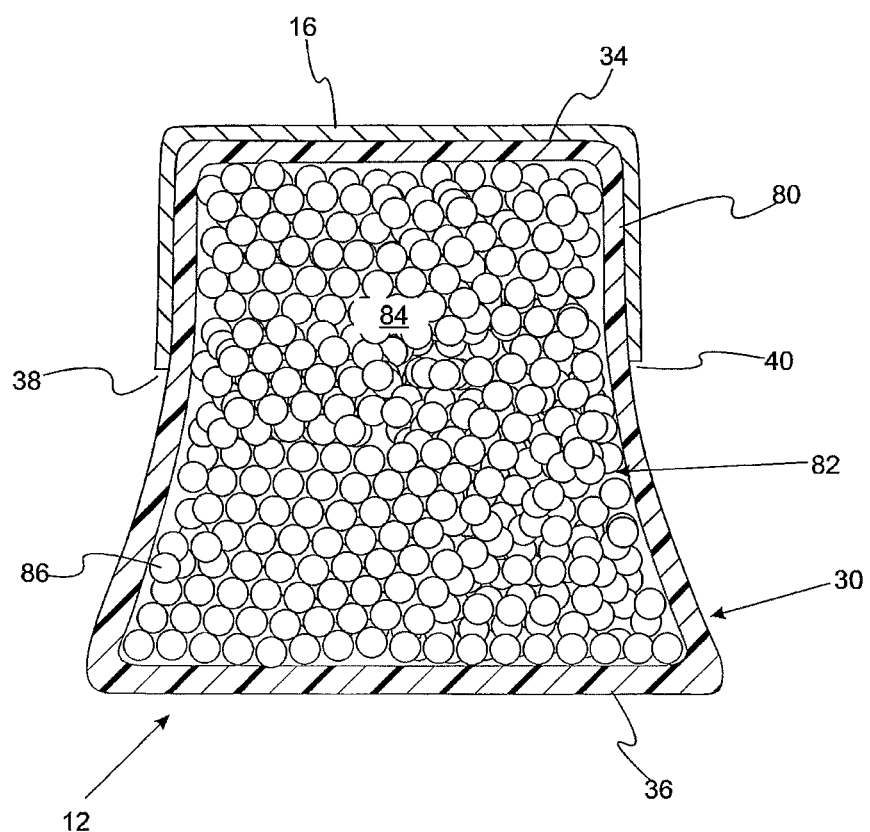
FIG. 3 schematically illustrates a cross-sectional view of a railroad tie along axis 3-3 in FIG. 2.

Turning now to FIG. 2, an embodiment of railroad tie 12 is schematically illustrated. Railroad tie 12 has two end sections 30 and a middle section 32. End section 30 includes a top surface 34 to which plate 16 is fastened. Opposed and parallel to top surface 34 is bottom surface 36 which is in contact with rail bed 20. Connecting top surface 34 and bottom surface 36 are two sides 38 and 40. An angle 42 between side 38 and top surface 34 may be perpendicular or range from 60° to 120°. An angle 44 between side 40 and surface 34 may also be perpendicular or, in another embodiment, range from 60° to 120°. Sides 38 and 40 may be linear, or curvilinear as illustrated in FIG. 3.

The height of the railroad tie 12 between top and bottom surfaces 34 and 36 may range from 4 inches to 16 inches in various embodiments. The width between sides 38 and 40 may range from 4 inches to 16 inches in different embodiments. The width between sides 38 and 40 may be effective to create a short column.

Figure 4:
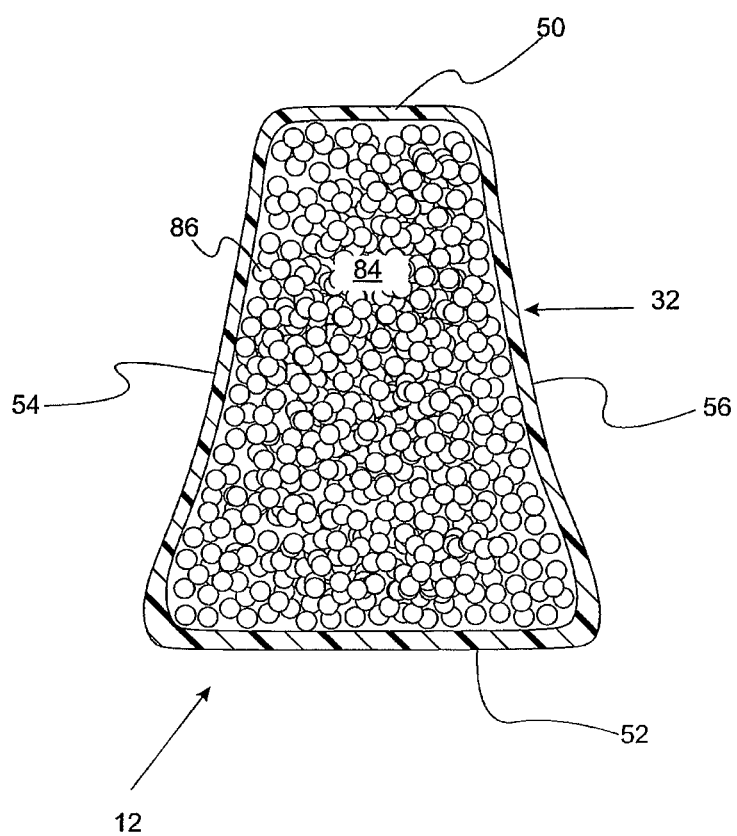
FIG. 4 schematically illustrates a cross-sectional view of a railroad tie along axis 4-4 in FIG. 2.

Middle section 32 includes a top surface 50 and a bottom surface 52 opposed and spaced apart from top surface 50. Connecting top surface 50 and bottom surface 52 are sides 54 and 56. Sides 54 and 56 may be linear, or curvilinear such as convex or concave, as illustrated in FIG. 4.

A transition 58 between the top surface 34 of end section 30 and top surface 50 of middle section 32 may be linear or curvilinear. A transition 60 between either sides 38 and 54 or sides 40 and 56 of the end section 30 and the middle section 50 may be linear or curvilinear. In at least one embodiment, the intersection of transitions 58 and 60 forms a Coons corner geometry 62.

Turning now to FIG. 3, a cross-sectional view of the end section 30 of railroad tie 12 along axis 3-3 of FIG. 2 is schematically illustrated. Wall 80, which includes outer periphery top and bottom surfaces 34 and 36, as well as sides 38 and 40, defines an interior cavity 82 into which a core 84 is formed. Wall 80 may be formed from a polymeric composition. The polymeric composition may include thermoplastic and/or thermoset polymers. In at least one embodiment, the polymeric composition is recyclable. Non-limiting examples of polymeric compositions suitable for wall 80 include polyolefins, such as polypropylene and polyethylene.

In certain embodiments, especially when the plastic standard articles are exported to cold environment, wall 80 includes a blow moldable thermoplastic polyolefin/polypropylene blend, a thermoplastic elastomer/polypropylene blend interpenetrating polyolefin blend, a thermoplastic having a glass transition temperature less than −80° C./polyolefin blend, a hetergeneous polymer blend, and a thermoplastic having a glass transition temperature less than −20° C./polyolefin blend, a thermoplastic vulcanizate/polyolefin blend. In certain embodiments, hetergeneous polymer blends having a crystalline thermoplastic phase and a high molecular weight or crosslinked elastomeric phase may be supplied by Exxon Mobile or Advanced Elastomer Systems.

In at least one embodiment, the ratio of thermoplastic polymer to polyolefin ranges from 5 wt. % to 70 wt. % of the blend. In another embodiment, the ratio of thermoplastic polymer to polyolefin ranges from 10 wt. % to 40 wt. %.

The thickness of wall 80 may range from 0.03 inches to 0.5 inches in at least one embodiment. In another embodiment, the thickness of wall 80 may range from 0.125 inches to 0.25 inches. In the illustrated embodiment, the wall is made of an elongated tube of polypropylene material having a wall thickness ranging from 0.14 inches to 0.17 inches before shrinkage which is blow-molded into the shape of the tie 12 having a finished wall thickness ranging from 0.13 to 0.16 inches.

Core 84 may include steam-expandable polymer particles 86, such as expanded polyolefin polymer beads. In at least one embodiment, the expanded polyolefin polymer beads includes expanded polypropylene polymer beads (EPP). In yet another embodiment, core 84 includes expanded high molecular weight polypropylene polymer beads. In yet another embodiment, homopolymer beads are included in the expanded polyolefin beads in order to increase the stiffness of core 84. As a non-limiting example, when the homopolymer polyolefin is a homopolymer polypropylene, the stiffness increases such that a 100,000 lb load yields a 5.8% strain and a compression of only 0.007 inches. In another example, the strain ranges from 2% strain to 10% strain. In at least one embodiment, EPP may be formed in situ by injection of steam into polypropylene beads to form steam-injected expanded polypropylene. It is understood that a portion of core 84 may comprise polyolefin beads in an unexpanded configuration or a partially expanded configuration.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$.

A load applied by a train may be more broadly distributed throughout core 84 by wrapping plate 16 around the sides 38 and 40 as shown in FIG. 3. Plate 16 forms an inverted "U" shape in order to support sides 38 and 40 and limits outward defection under load.

In FIG. 4, middle section 34 of railroad tie 12, in certain embodiments, includes a cavity 84 which is filled with expanded polyolefin. The expanded polyolefin particles 86 filling cavity may have a density that is less than, equal to, or greater than the density of expanded polyolefin in cavity 84 of end section 30. In another embodiment, end section 30 has a density of EPP that is at least 1 lb/ft$^3$ less than the density of EPP in middle section 34. While FIGS. 3 and 4 describe having 3 density zones, it is understood that railroad tie 12 may have one or more density zones without exceeding the scope or spirit of the embodiment. Further, it is understood that, in certain embodiments, the density zones may comprise a relatively uniform gradient of density throughout portions of the railroad tie 12 without relatively clear demarcation of one or more density zones. In the illustrated embodiment, the density of the EPP beads in the end section is 5 lbs/ft$^3$ while the density of the EPP beads in the middle section is 3 lbs/ft$^3$.

Figure 5:
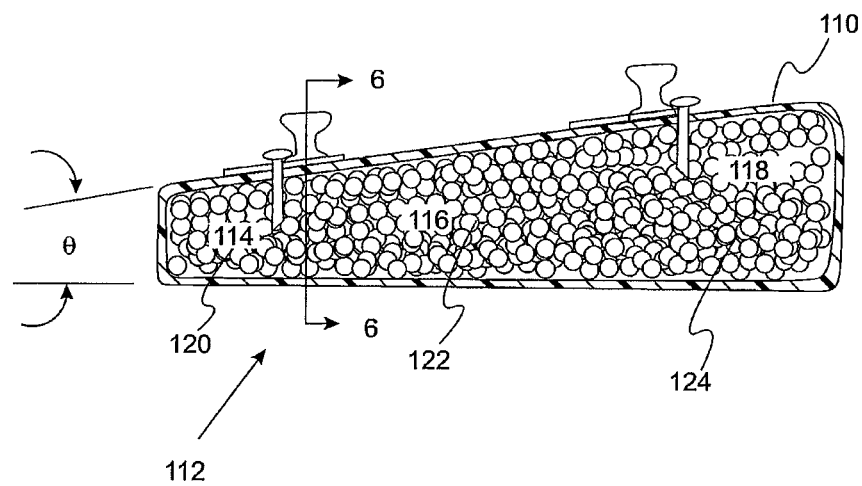
FIG. 5 schematically illustrates a cross-sectional view of a second railroad tie embodiment.

Turning now to FIG. 5, in at least one embodiment an angled railroad tie 112 suitable for use in a curved railroad pattern is schematically illustrated in cross-sectional view. Angled railroad tie 112 is formed from an angular wall section 110 which defines three sub-cavities 114, 116 and 118. Into cavity 114, a first expanded polyolefin 120 is formed. Into sub-cavity 116, a second expanded polyolefin 122 having a density less than expanded polyolefin 120 is formed. Into cavity 118, a third expanded polyolefin 124 having a third density is formed. In other embodiments, the densities of expanded polyolefins 120, 122 and 124 may be equal or different.

The angle of angled railroad tie 112 is given by angle $\ominus$. Angle $\ominus$ is determined by a camber needed for safe passage of a train in a curve in the rail track pattern 10. It is desirable to have angled railroad tie 112 because rail bed 20 may be uniformly prepared as a flat and level bed surface. In at least one embodiment, the angle $\ominus$ may range from 0.1° to 30°. In another embodiment, the angle $\ominus$ may range from 0.5° to 10°. In yet another embodiment, the angled railroad tie comprises a wedge shape.

Figure 6:
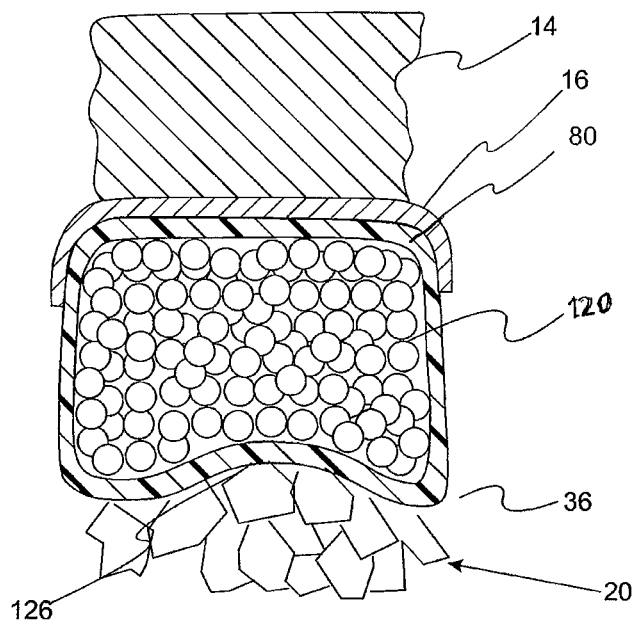
FIG. 6 schematically illustrates a fragmentary cross-sectional view of a railroad tie along axis 6-6 in FIG. 5.

Turning now to FIG. 6, a transverse, cross-sectional view along axis 6-6 of FIG. 5 is illustrated. Bottom surface 36, in at least one embodiment, includes a retention structure 126 which interacts with rail bed 20 to form an interference that reduces the tendency of the railroad tie 112 to move when a directional force is applied to railroad tie 112 by the passage of a train.

Figure 7:
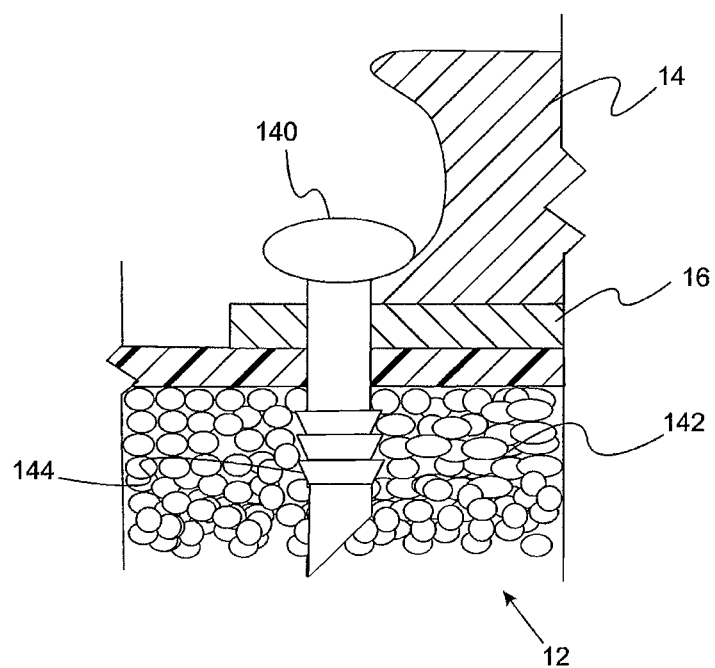
FIG. 7 schematically illustrates a fragmentary longitudinal, cross-sectional view of a railroad tie and rail system illustrating spike placement.

FIG. 7 illustrates a ringed shank fastener 140, such as a spike for use with railroad tie 12. The expanded polyolefin 142 moves aside as the ringed shank spike 140 is driven into railroad tie 12 in at least one embodiment. The expanded polyolefin 142 then rebounds to wrap around the ring shanks 144 of the spike 140 to secure the rail 14 and plate 16 to railroad tie 12.

In at least one embodiment ring shank 144 extends 0.100 inches to 0.300 inches from the root of spike 140. Ring shank 144 is configured as an inverted frustro conical section. Spike 140 may include a plurality of such frustro conical sections sequentially configured along the longitudinal axis of spike 140. It is understood that other shapes providing an undercut may be suitable for use with spike 140.

Figure 8:
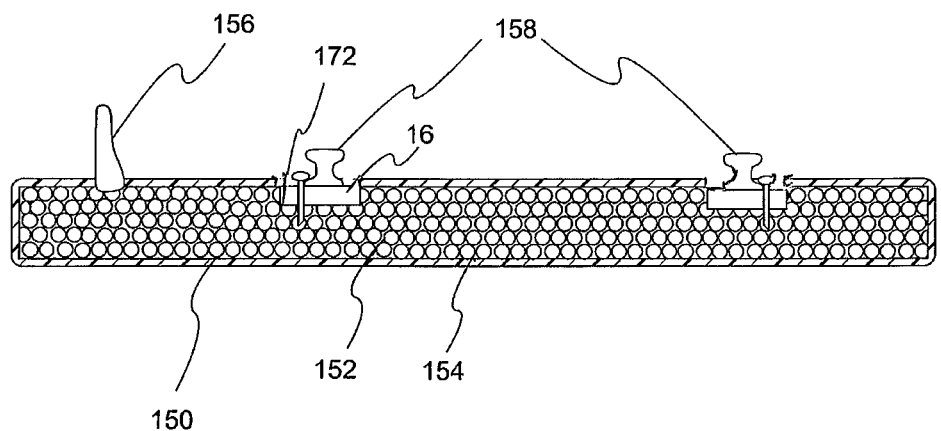
FIG. 8 schematically illustrates a cross-sectional view of a third rail configuration with a railroad tie.

FIG. 8 illustrates a third rail configuration for use with a railroad tie 150 according to at least one embodiment. Railroad tie 150 includes an expandable polyolefin 152 in a cavity defined by wall 154. A third rail device 156 is mounted on railroad tie 150. Third rail device 156 is electrified to supply power to an electrical train. Electrical power is then transferred to rails 158 back to the power station.

In addition, FIG. 8 illustrates having plate 16 inset into a plate retention structure 172 embossed into tie 150. It is understood that retention structure 126 and plate retention structure 172 may be present in the same railroad tie.

Figure 9:
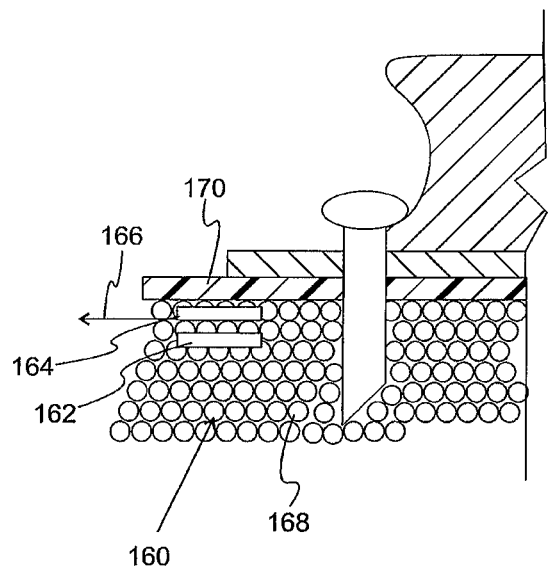
FIG. 9 schematically illustrates a fragmentary cross-sectional view of a railroad tie with load sensors.

FIG. 9 illustrates a fragmentary cross-section of a railroad tie 160 in which sensors are embedded according to at least one embodiment. One or more sensors, such as a RFID chip 162 with a piezoelectric strain gauge 164, may be embedded in an expanded polyolefin 168 in a cavity defined by wall 170. An optional conduit 166 may permit electrical connection of sensor 164 to an external signaling device. Sensors 162 and/or 164 may be introduced into the expanded polyolefin 168 prior to injection of the steam to expand the polyolefin beads. In another embodiment, the sensors may be place in the railroad tie 160 after demolding of the railroad tie by mechanical insertion means known in the art.

A typical railroad tie 12, in at least one embodiment, has a weight ranging from 10 lbs. to 200 lbs. for a 9 inch by 7 inch by 102 inch railroad tie. In another embodiment, railroad tie 12 has a weight ranging from 20 lbs. to 100 lbs. In yet another embodiment, railroad tie 12 has a weight ranging from 30 lbs. to 75 lbs so that the tie can be carried by a single worker.

When railroad pattern 10 uses railroad tie 12, the expanded polyolefin core functions as an energy absorber. In at least one embodiment, railroad tie 12, when using expanded polypropylene as the core, experiences a deflection before permanent set in excess of 25%.

The force needed to deflect the railroad tie may be characterized by a spring rate which is a function of a cross-sectional area bending moment of the railroad tie 12, a length of the railroad tie 12 and an elastic modulus of the expanded polyolefin. Having a higher spring rate than wood, the expanded polyolefin in the railroad tie 12 may have a greater yield stress than wood. Having greater yield stress may result in the expanded polyolefin railroad tie having greater energy absorption than the wood railroad ties. Increased energy absorption by the expanded polyolefin-based railroad ties may result in a relatively quiet railroad system when the train passes over the expanded polyolefin-based railroad ties.

The spring rate of the railroad tie may be increased or decreased by increasing or decreasing the density of the expanded polyolefin in the railroad tie core by use of methods disclosed in certain embodiments herein.

Polyolefin beads and methods of manufacture of unexpanded polyolefin beads suitable for making the illustrated embodiment are described in Japanese patents JP60090744, JP59210954, JP59155443, JP58213028, and U.S. Pat. No. 4,840,973, all of which are incorporated herein by reference. Non-limiting examples of expanded polyolefins are ARPLANK® and ARPRO® available from JSP, Inc. (Madison Heights, Mich.). Alternatively expanded polystyrene of polyethylene bead can be used but polypropylene is preferred for the railroad tie application.

The expanded polypropylene, such as the JSP ARPRO$^{TS}$ EPP, which has no external shell, exhibits physical properties such as in Table 1.

TABLE 1

| Property | Test Method | Units | Value | | | | | |
|---|---|---|---|---|---|---|---|---|
| Density | ASTM D-3575 | lbs/ft$^3$ | 1.0 | 2.8 | 3.7 | 4.2 | 4.6 | 5.0 |
| Compressive Strength | ASTM D-3575 | lbf/in$^2$ | | | | | | |
| @ 10% deflection | | | 8.4 | 32 | 44 | 53 | 61 | 68 |
| @ 25% deflection | | | 11 | 42 | 57 | 65 | 76 | 84 |
| @ 50% deflection | | | 19 | 54 | 73 | 84 | 97 | 112 |
| @ 75% deflection | | | 41 | 111 | 155 | 183 | 220 | 251 |
| Compressive Set | ASTM D-3575 | % | | | | | | |
| @ 25% deflection | | | 8 | 7 | 7 | 7 | 7 | 7 |
| @ 50% deflection | | | 16 | 12 | 12 | 12 | 12 | 12 |
| Compressive Creep | ASTM D-3575 | % | <0.5 | 1 | 1.5 | 2.5 | 3.0 | 3.5 |
| @ 1000 hr | | | | | | | | |
| Service Temperature | ASTM D-3575 | ° C. | 100 | 100 | 100 | 100 | 100 | 100 |

Figure 10:
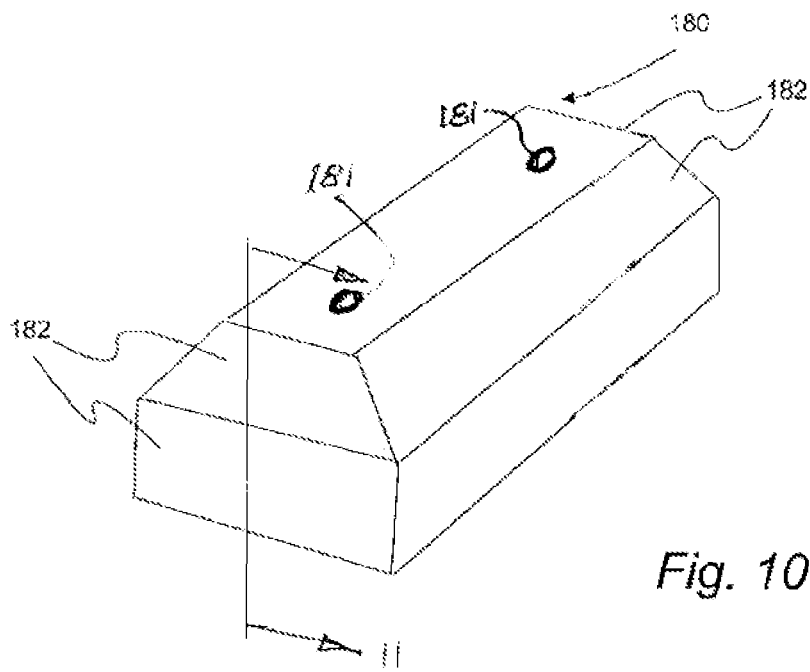
FIG. 10 schematically illustrates a bumper according to at least one embodiment.
Figure 11:
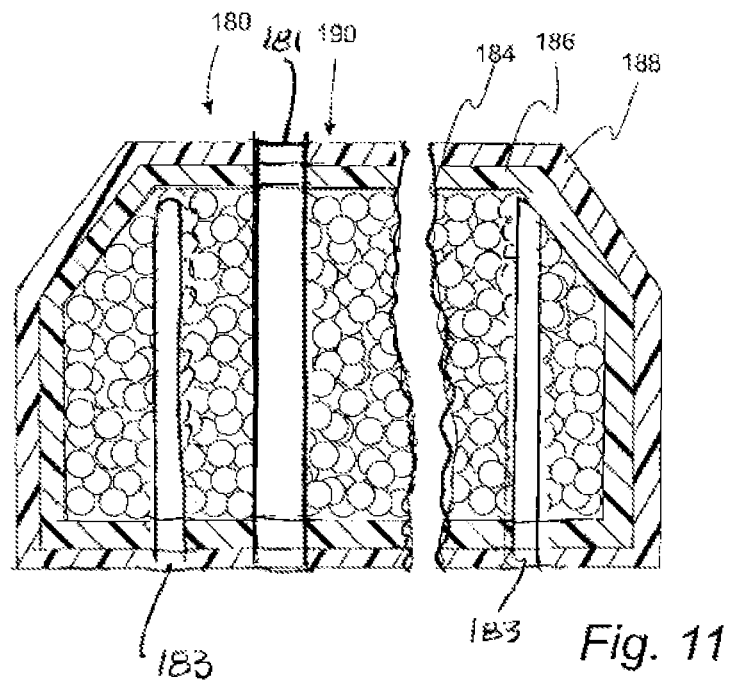
FIG. 11 schematically illustrates a cross-sectional view along axis 11-11 of FIG. 10.

Turning now to FIGS. 10 and 11, an embodiment of a bumper 180, such as the bumper suitable for a large truck chock block, a parking lot bumper, a dock bumper, a golf cart bumper, a roof for a low-speed vehicle, or ship fenders is schematically illustrated in isometric view in FIG. 10. Bumper 180 has an elongated tubular shape with one or more facets 182. The roof for the low-speed vehicle may range in thickness from 0.25 inches to 2 inches, preferable 0.75 inches to 1.25 inches.

In FIG. 11, a longitudinal cross-sectional view along axis 11-11 of FIG. 10 is schematically illustrated. The core 184 has a substantially uniform density of steam-expanded polypropylene beads throughout the entire profile of the elongated bumper 180. A pair of through holes 181 extend through the bumper to enable the bumper to be attached to the parking lot surface. Holes 181 can be formed by a large steam pins, while smaller blind holes 183 are formed on the part underside by steam pins spaced as needed across the part.

The shell 190, in at least one embodiment, is comprised of two layers: an inner layer 186 and an outer layer 188. The two layers 186 and 188, are formed concurrently when a blow mold parison is formed with two layers by coextrusions or methods known in the art Inner layer 186 may have a first set of properties, such as recycled plastic composition, and outer layer 188 may have a second set of properties, such as including an ultraviolet light resistance package or a pigment. It is understood that outer layer 188 may have a different composition from inner layer 186. As a non-limiting example, outer layer 188 may include a co-polymer or 0-5 wt % of linear low density polyethylene (LLDPE) in order to increase flexibility of outer layer 188 resulting in reduced stress cracking. It is further understood that while two layers are illustrated here, a plurality of layers is contemplated. In another embodiment, the number of layers may range from one to 11. It is preferred that inner layer 186, outer layer 188, and core 184, have similar, if not identical compositions, to improve the recyclability of bumper 180.

Figure 12:
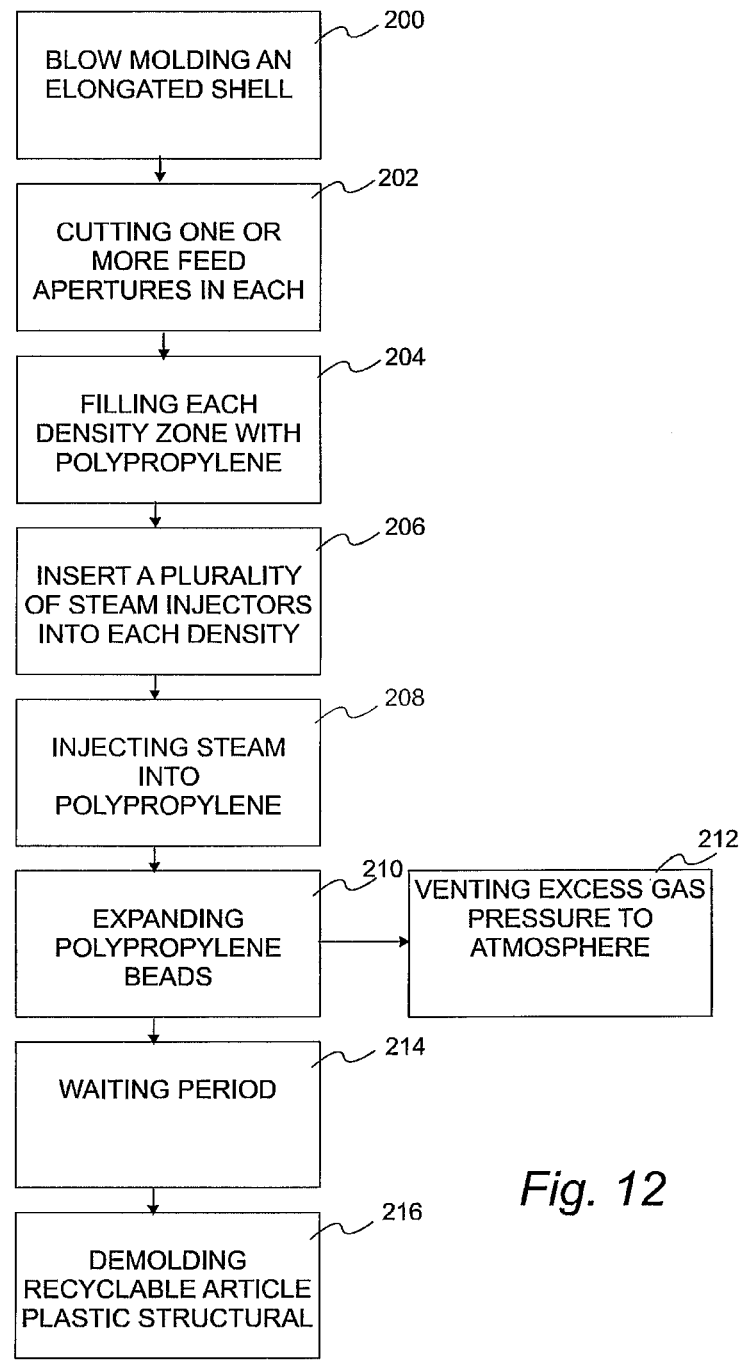
FIG. 12 illustrates a process flow diagram of a method of manufacture of a railroad tie according to at least one embodiment.

FIG. 12 diagrammatically illustrates a method for manufacturing the recyclable plastic structural article having multiple core density zones, in at least one embodiment, which includes blow-molding a hollow elongated shell in step 200. Feed apertures, such as an inlet, and heating ports are cut or pierced during step 202 into the blow-molded elongated shell of step 200. Polyolefin pellets are fed into the cavity of the elongated shell of step 200 during step 204. The density of polyolefin pellets in the lower first end of the elongated shell, are feed in first followed by the middle section, and/or the second end is controlled in step 204 during filling of the shell in one or more density zones. Steam injection needles can be inserted during step 206 into each density zone through heating ports or alternately the needles can be inserted at sit 204 before filming. In step 208 steam is injected at sufficient pressure effective to cause the polypropylene pellets to expand in step 210. Excess pressure is vented to the atmosphere in step 212. The molded railroad tie is allowed to cool in step 214. The mold is opened in step 216 to release the blow-molded recyclable plastic structural article.

Blow-molding step 200 preferably includes extruding a tubular parison. The mold is closed on the parison and about 90 to 100 lbf/in$^2$ pressure gas is applied to the parison interior cavity. The gas injected into the parison causes the plastic to conform to the shape of the walls of the mold. One or more gas injection needles are introduced to the parison prior to the cooling the plastic on the mold walls. Spacing between steam injection needles may vary with the density of unexpanded beads because the steam migration is limited. In at least one embodiment, the spacing between adjacent steam injection needles ranges from 2 inches to 6 inches.

In at least one embodiment, at approximately one half of the length of the cooling period, typically referred to as a blow cycle, feed apertures, such as fill ports, are cut. The cutting tools are withdrawn from the mold and a staged fill sequence for polyolefin pellets begins in step 204. The filling is preferably conducted from the bottom up. Upon completion of the staged fill sequence, the feed apertures are optionally closed with spin-welded plugs. The steam injection needles are injected to introduce steam for an injection time period ranging from 0.5 to 3 seconds, an injection time period sufficient to expand the bead. In at least one embodiment, steam is introduced as super heated steam. In another embodiment, steam is introduced at a pressure less than the clamp pressure on the mold sections. In yet another embodiment, steam is introduced in a range of 15 lbf/in$^2$ to 120 lbf/in$^2$. In at least one embodiment, the steam is introduced at 280° Fahrenheit and 60 lbf/in$^2$ pressure. After a cooling time period, when post-mold expansion effectively ceases, the mold is opened to release the blow-molded railroad tie. In at least one embodiment, the time to cool the railroad tie so that post mold expansion does not substantially occur ranges from about 1 minute to 8 minutes. Optionally, the mold may be vented to the atmosphere to release excess gas pressure or the mold may be burped, i.e., opened briefly and then re-closed.

Embodiments of steps 200, 202, 204, 206, and 208 are illustrated in FIGS. 13a-13d.

Figure 13:
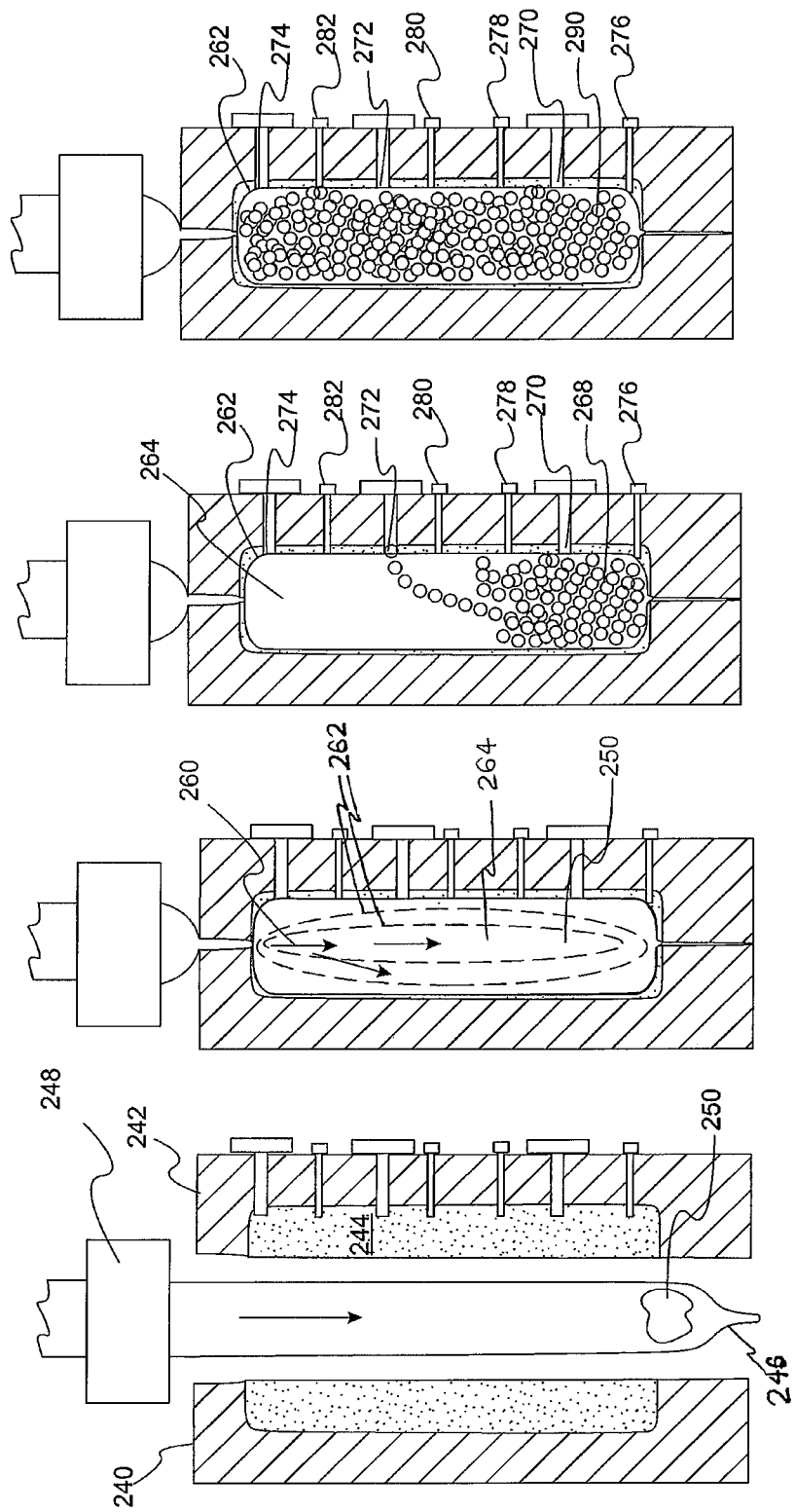
FIGS. 13a-13d schematically illustrate a process of manufacture of a railroad tie according to at least one embodiment.

In FIG. 13a, blow mold sections 240 and 242 define a blow mold cavity 244 into which a molten polyolefin parison 246 is extruded from an extruder 248. Parison 246 defines an internal parison cavity 250.

In FIG. 13b, blow mold sections 240 and 242 close upon parison 246. Gas 260 is injected into parison cavity 250 inflating the hot parison 246 while still soft and deformable to conform to the walls of the blow mold cavity 244 defining a shell 262 having a cavity 264 which may be larger than the original parison cavity 250.

In FIG. 13c, steps 202 and 204 of FIG. 10 are illustrated as feed apertures 270, 272, and 274 are cut through shell 262. Staged filling begins as unexpanded EPP beads 268 are introduced to cavity 264 through an EPP introduction device fitted to blow mold section 242. At a first stage, EPP beads 268 are introduced through feed aperture 270. When the cavity 264 is substantially filled to the height of feed aperture 270, a second stage introduces unexpanded EPP beads 268 through aperture 272 until that portion of cavity 264 is substantially filled. A third stage introduces unexpanded EPP beads 268 through aperture 274 until the cavity 264 is filled.

EPP introduction device (not shown) is withdrawn from apertures 270, 272, and 274. The apertures 270, 272, and 274 are plugged. Steam injection needles 276, 278, 280, 282 are inserted through blow mold section 242 and shell 262 into the filled cavity 264.

In FIG. 13d, steam is injected through steam injection needles 276, 278, 280, 282 into unexpanded beads 268 causing the beads to expand forming a core 290 in the area that was previously cavity 264, and bonded to the shell 262.

Figure 14:
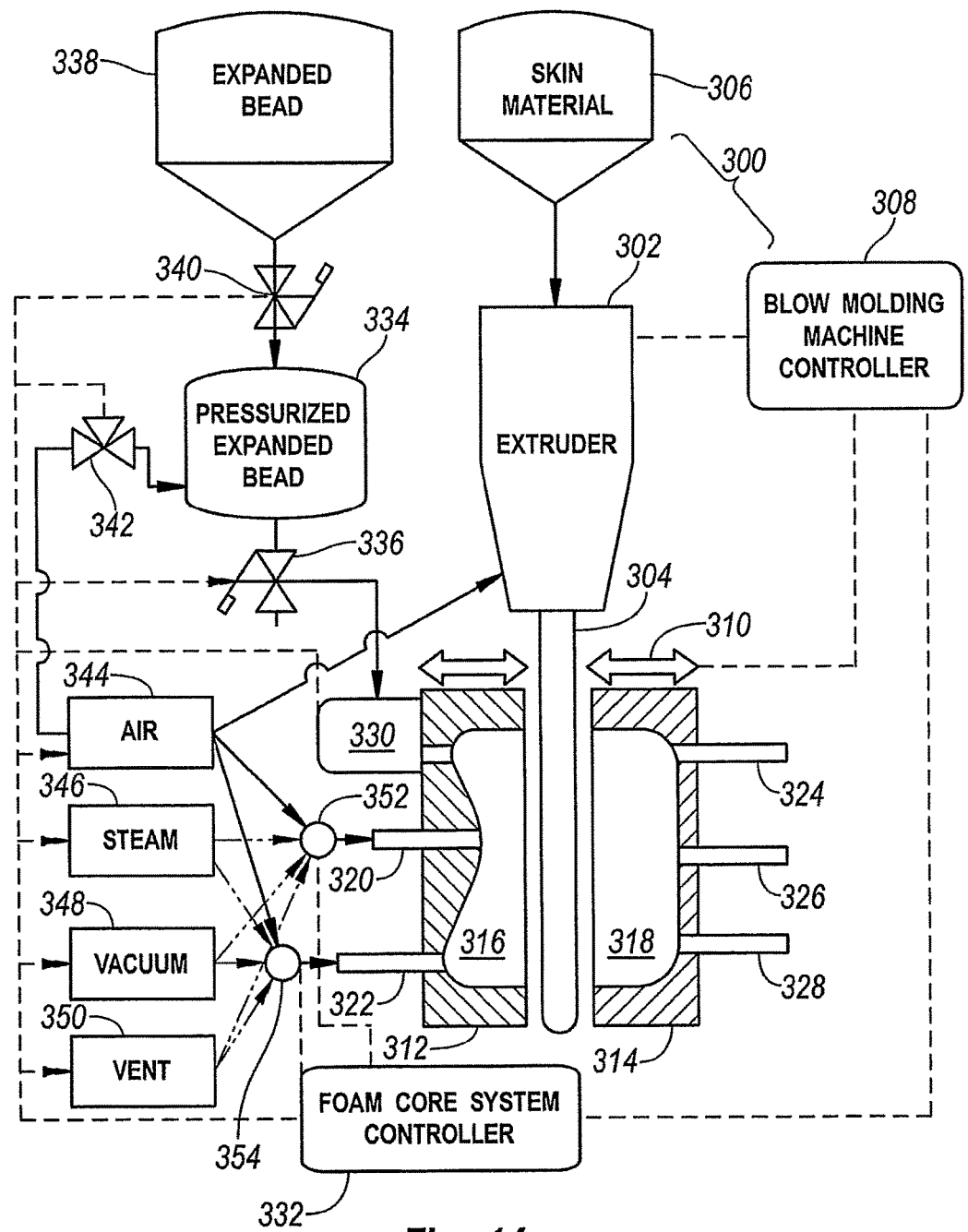
FIG. 14 is schematic illustration of an extrusion blow molding machine equipped with a foam core system.

FIG. 14 illustrates an extrusion blow molding machine 300 having a vertical extruder 302 for forming an elongate hollow plastic parison 304 out of plastic skin material supplied by hopper 306. A bold molding machine controller 308 controls the operation of extruder 302 and a mold actuator 310 capable of moving two mold halves 312 and 314 positioned on opposing lateral sides of the extruded parison 304 and between an open position illustrated and a closed position to entrap the parison within an internal cavity formed by internal mold cavity halves 316 and 318. Mold halves 312 and 314 are specifically adapted for forming a foam core article using the described methods. The mold halves are provided with a series of steam injector pins 320-328. Although only five steam pins are illustrated for simplicity purposes, the steam pins will be provided in an array having a sufficient number to thoroughly steam the product to be formed.

At least one of the mold halves will be provided with a bead fill gun 330 having a bead fill port which communicates with mold interior cavity portion 316. For simplicity purposes a single fill gun is illustrated, however, multiple filled guns at various locations can be provided as illustrated previously with respect to FIGS. 13a-13d. Preferably, at least one fill gun is located generally proximate the upper region of the mold cavity as illustrated in FIG. 14. Fill gun operation is controlled by a foam core system controller 332. Preferably, foam core system controller 332 is a separate controller which communicates with the blow molding machine controller 308. In that way, the foam core system can be added to existing blow molding extruding systems. Alternatively, the foam core system controller can be incorporated into the blow molding machine controller for new machines or in reconstructed blow molding extrusion machines.

The bead fill gun 330 is supplied with expanded bead under pressure from tank 334 which is coupled to the fill gun 330 by an interconnecting supply line containing and valve 336 controlled by foam core controller 332. The expanded bead is supplied to pressurized tank 334 from an expanded bead hopper 338 by a supply line containing a valve 340, again regulated by the foam core system controller 332. The pressure of the expanded bead in tank 334 is maintained by a three-way pressure regulator valve 342 coupling the pressurized tank 334 to a source of pressurized air 344. The operation of the three way pressure regulator valve 342 is controlled by the foam core controller enabling the controller to pressurize the tank to the desired pressure, preferably, 80 to 120 pounds per square inch gauge pressure (PSIG) and to alternatively vent the tank 334 to atmosphere to facilitate the introduction of more bead into the tank.

The steam pins 320-328 can be alternatively connected to pressurized air source 344, steam source 346, a vacuum source 348 and a vent 350. To facilitate these alternative connections and to enable a number of steam pins to be associated together in zones, a steam pin manifolds 352 and 354 are provided. In the illustrate schematic, only two manifolds are shown for simplicity, however, preferably, up to ten and more preferably about 6 manifolds can be operated by the foam core system controller. Each of the manifolds are connected to a series of steam pins and each manifold has an input/output connection to each of the air source, steam source, vacuum and vent 344, 346 and 348 and 350. Each of the input/output connections is controlled by a flow valve operated by the foam core system controller.

Figure 15C:
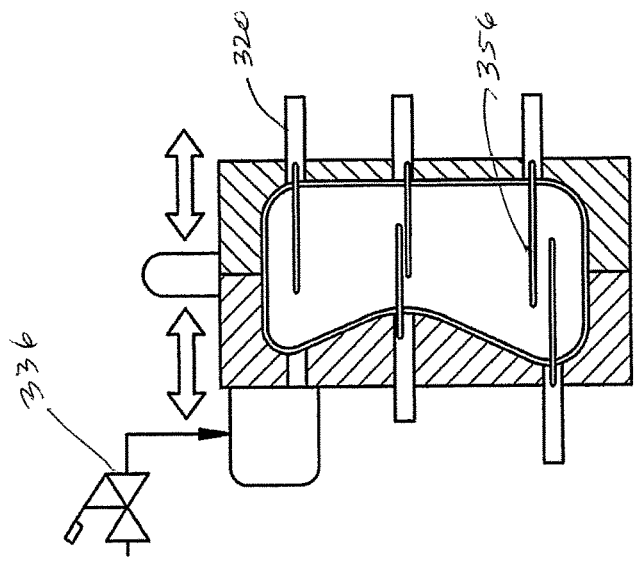
Figure 15B:
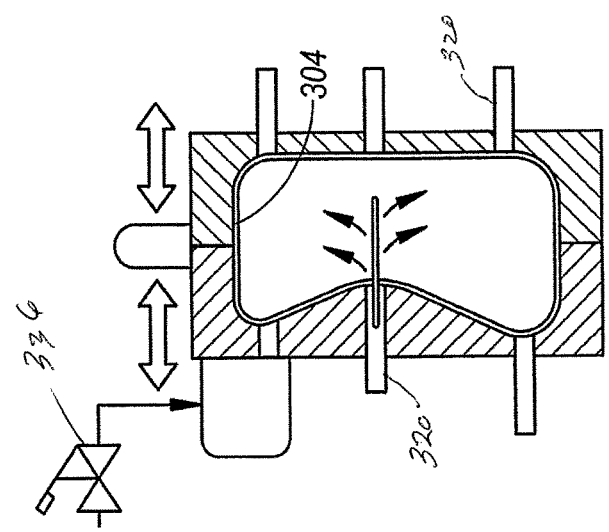
Figure 15A:
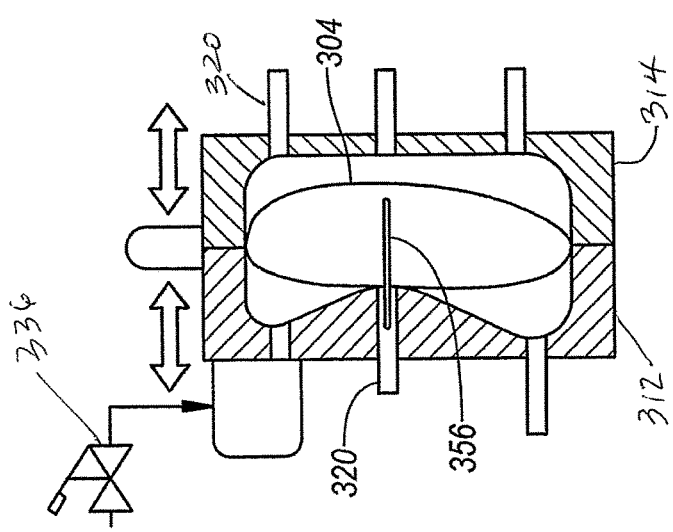
Figure 15D:
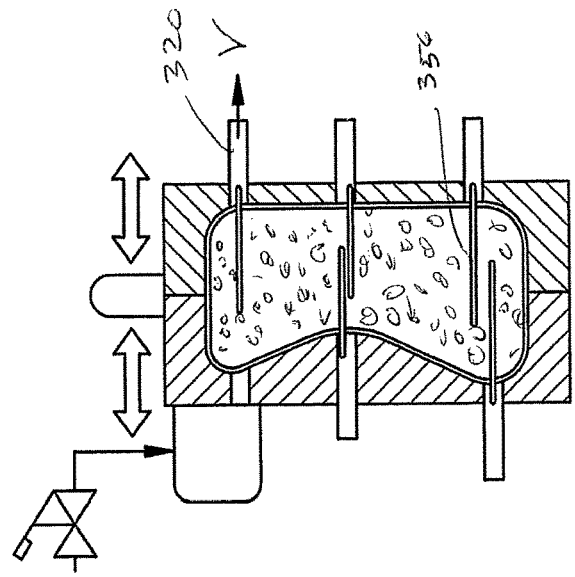

In operation, with the mold shown in the open position, as illustrated in FIG. 14, the extruder forms a tubular hollow plastic parison 304 of the thermoplastic skin material. Once the parison has reached the desired length relative to the cavity, the blow molding machine controller issues a closed mold signal causing the mold drive 310 to close the mold halves together. Upon issuance of the closed mold signal, the foam core system controller begins operation and temporarily takes over control of the blow molding machine. Immediately prior to or contemporaneously with the closing of the mold, the extruder will provide pressurized air into the internal cavity defined by the parison in what is known as a puffing operation so that when the mold is closed as illustrated in FIG. 15a, a portion of the partially inflated parison wall will contact a region of the mold cavity as illustrated. One or more steam pins in this first contacted region of the mold will be actuated driving a steam pin needle 356 into the hollow interior cavity of the blow molded parison 304. Once the first actuated needle or needles 356 extend into the parison, the foam core controller, opens the air valve supplying air to manifold 354 which in turn supplies air to needle 356 to blow the plastic parison 304 into a shell fully conforming it to the interior surfaces of the cavity halves 316 and 318 of mold halves 312 and 314. Once fully inflated, as shown in FIG. 15b, the controller will open air valves to the other manifolds 354 so that all the needles from all of the steam pins projecting provide pressurized gas such as air into the interior cavity of the parison 304 to fully conform to the interior shape of the mold cavity. As will be described further in detail, subsequently, foam core system controller will cause all of the steam pins to be vented initially allowing the internal pressure within the shell to drop from the blow molding pressure of 80 to 120 PSIG, preferably 90 PSIG. Once the pressure drops down to about 40 PSIG the fill gun cutter punches or cuts a hole into the hollow shell. The cutter then retracts as illustrated in FIG. 15 D, and the filling process begins. When the pressure nears the tank pressure, all of the steam pins will be closed accept the most remote steam pins from the fill gun which were main vented whereupon the control valve 336 will open and the fill gun mandrel will open along via flow from the pressurized tank 334 into the shell cavity in a controlled manner. The venting of the manifold associated with the remote steam pins will be controlled to maintain a desired part cavity pressure. When the pressure drops below that of the pressurized bead tanks 334, which is about 30 PSIG+ or −2PSIG bead flows into the shell cavity. The pressure of the vented manifold is maintained approximately 5PSIG below the fill tank pressure providing adequate pressure differential for the quick and orderly filling of the cavity with bead without forming voids.

Figure 15E:
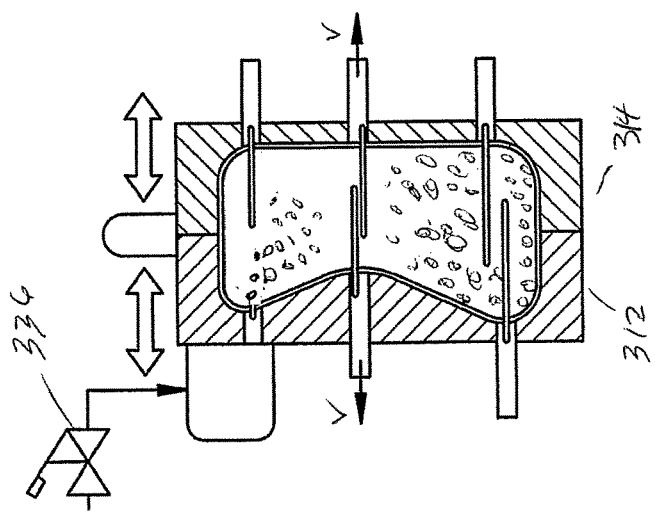
Figure 15F:
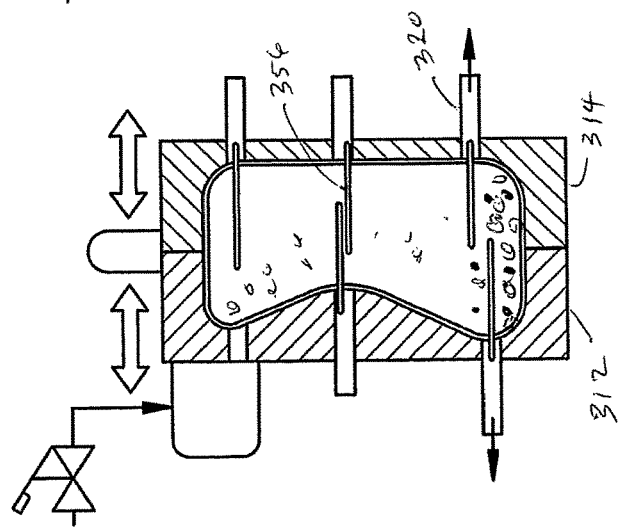

Once the distal region of the cavity is initially filled with beads, then the next set of steam pins is vented as is illustrated in FIG. 15e and the filling operation continues zone by zone until the final collection of steam pins proximate the fill gun is vented. Upon the achieving a substantially completely filled with beads, the fill gun closes as will be described in more detail. Subsequently, once closed, all of the steam vents are vented to atmosphere. Once vented to atmosphere, the beads further expand in size from their fill state and grow approximately 3% in volume as the pressure within the cavity cell drops from 25 PSIG to atmospheric pressure. This causes the beads to completely fill the cavity and to be slightly deformed as they contact one another.

Once the cavity is vented, the bead steaming process will begin one-half of the steam pins will be connected to a steam source while the other half of the steam pins will be connected to the vacuum source or alternatively, connected to atmosphere and the system operated without a vacuum source. After a relatively short time period, the initial steam pins provided with steam will be connected to the vacuum source and the remaining pins will be connected to the steam vent and the steam process will continue until the expanded beads are heated sufficiently to expand and melt together and to bond to the wall of the skin. Following the steam process as illustrated in FIG. 15g, the condensate, removal and cooling step begins. One half of the steam pins will be connected to a source of pressurized air while the other half of the steam pins will be vented to atmosphere. Then, the pins originally connected to pressurized air will be vented to atmosphere and the vented pins will be connected to a source of pressurized air. This step removes condensate from the bead steaming from the expanded bead and causes the bead to be cooled. This process continues until the bead has reached the desired temperature, whereupon the steam pin needles are refracted and the mold halves opened so the part can be de-molded as shown in 15i. At this point, the foam core controller passes control of the operation back to the blow molding machine controller so that the next part can be formed.

Figure 16D:
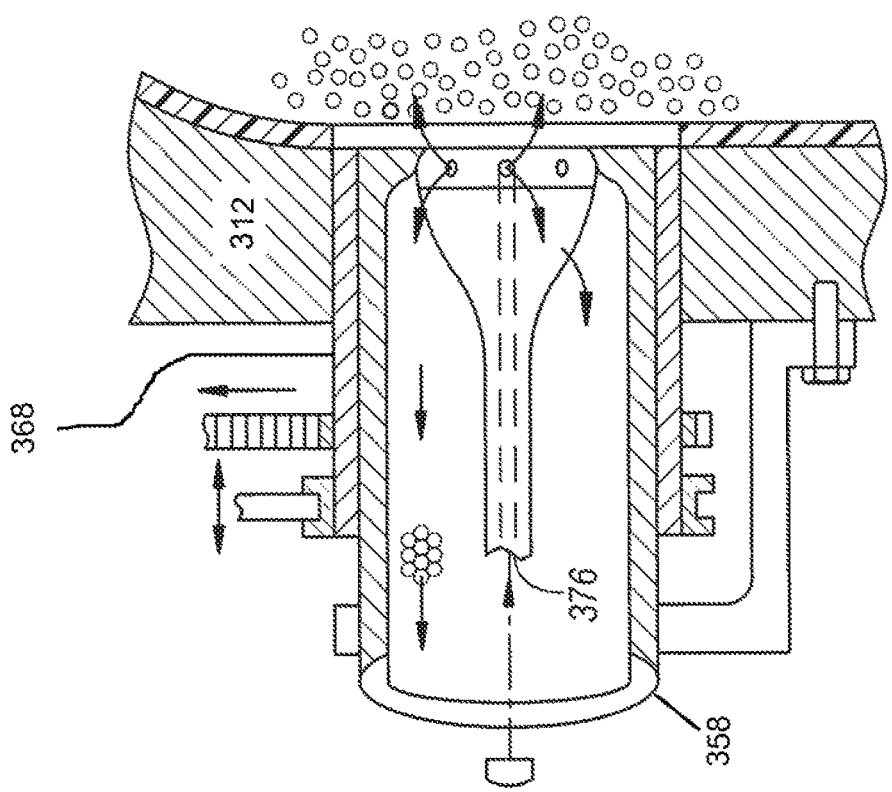

An enlarged schematic illustration of blow gun 330 is shown in FIGS. 16a-16d, illustrating various states of operation. In FIG. 16a, the fill gun is shown in the closed orientation. Blow gun 330 is installed in mold cavity half 312. The fill gun has three main components; a fill tube 358 having a distal end flush with the mold cavity interior wall forming a fill aperture surrounded by frusto conical valve seat 360. An elongate mandrel 362 has a distal end forming a face 364 conforming to the cavity wall when the mold halves are in the closed position and a frusto conical surface 366 which cooperates with frusto conical seat 360 of the fill tube 358 to form a tight seal when the mandrel is moved to the closed position as shown in FIG. 16a. When closed, mandrel 362 prevents beads from entering the cavity and the base of the mandrel 364 and the associated face of the distal end of the fill tube 358 conformed to the interior cavity wall of mold half 312 as the plastic parison 304 is blown into a shell conforming to the cavity interior as illustrated in FIG. 16a. Preferably, after the plastic shell wall is cooled sufficiently and is maintained in conformity to the mold cavity by the interior gas pressure, a tubular hole saw 368 is operated. The tubular hole saw 368 surrounds fill tube 358 and rotatably fits within a correspondingly sized cylindrical cavity in mold half 312. Tubular hole saw 368 is provided with an external drive gear or sprocket operatively driven by a belt chain or mechanical gear to rotate the saw relative to the mold. A conventional drive 370 can be utilized provided as relatively compact and meets the minimal speed and load requirements of a hole saw. The hole saw is also provided with an actuator mechanism such as a fork operated by a hydraulic or pneumatic cylinder to advance the linear rotating hole saw into the cavity interior as shown in FIG. 16D, cutting a round plug out of the shell wall whereupon the actuator 372 will retract the hole saw and the operation of the drive mechanism can be terminated.

Figure 16C:
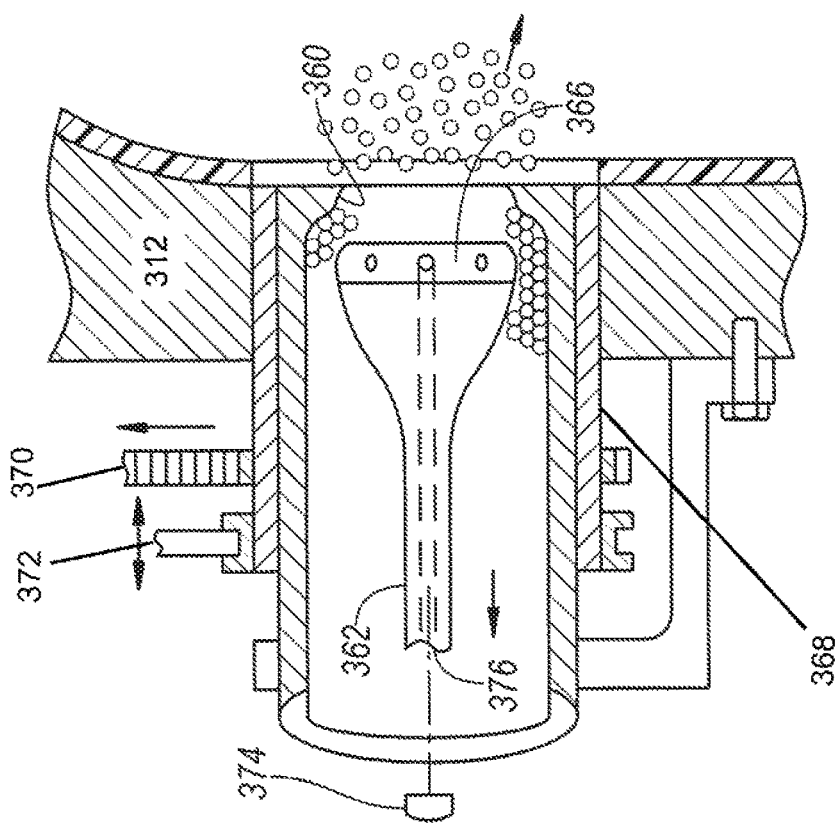

With the hole in the shell formed, the fill process can begin. As shown in FIG. 16c, the mandrel 362 is retracted by a linear actuator 374 such as pneumatic or hydraulic cylinder or an electric linear actuator such as ball screw to cause the frusto conical face 366 to lift off of conical seat 360 allowing bead to flow into the interior of the plastic shell. The fill process continues until the plastic shell is completely filled as previously described.

In order to close the fill gun, it is necessary to remove the bead from the region of the conical seat 360 and the corresponding frusto conical face 366. To do so, a tubular passage 376 allows air to be provided to a series of outlet ports in frusto conical face 366, the high pressure blast of air exiting these outlet ports, clears the bead allowing the mandrel to be closed. In order to enable the bead to be blow back out of the fill tube, optionally, the fill valve 336 can be maintained in the open position and the pressure in the tank 334 can be reduced enabling the bead to be pushed back through the fill gun and fill line into the pressure tank 334.

In the embodiment illustrated in FIG. 14, a single pressure tank is provided coupled to a source of bead. If multiple density bead is to be used, it is possible to have multiple pressure tanks, each with its own supply of different density bead coupled to a single fill gun. After a desired amount of the first bead is introduced, the pressure tank can be vented and pressurized air supplied to the mandrel to blow the bead in the fill tube back into the pressure tank, whereupon the pressure tank valve can be closed and the pressure tank valve for a second source of bead of a different density can be connected to the fill gun to continue the filling process. Accordingly, it is possible to build a railroad tie as described previously, having high density beads in the railroad tie ends and a low density bead in the center utilizing a single fill gun and the upper end of the railroad tie as molded, the fill gun alternatively being connected to the two different pressure tanks containing different density bead.

Figure 17:
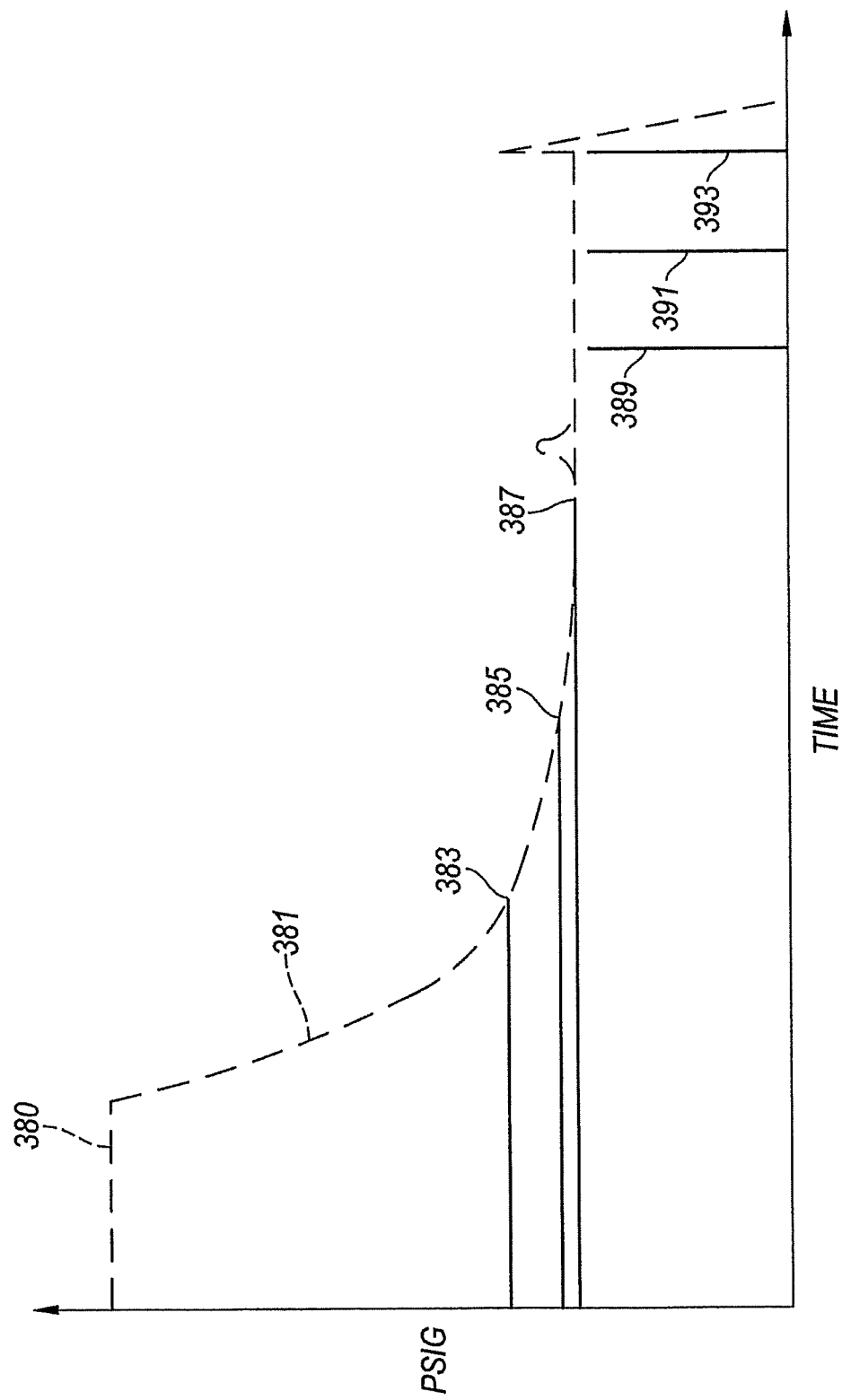
FIG. 17 is a diagram of mold pressure versus time prior to and during the bead fill process.

FIG. 17 is a pressure diagram illustrating the pressure in the mold cavity interior as the part is initially blown, vented and filled with bead. The pressure represented by the dotted line is proportional to the pressure within the mold and pressure will be measured at the steam pin manifold or closer to the mold at the steam pin. During the blowing process, the cavity pressure is at a blow pressure 380 which is about 80-120 PSIG, preferably about 90 PSIG. When the blow cycle is complete, the steam pin vents open causing a rapid pressure drop as illustrated in region 381 of pressure curve. At a selected pressure, in this instance approximately 40 PSIG illustrated at point 383, all the steam pins are closed except for the most distal steam pins allowing the pressure to continue to drop at a reduced rate. At the next selected pressure point 385, which is approximately 30 PSIG, the hole saw cuts the fill hole and retracts. When the pressure drops further and reaches a fill pressure, which in this embodiment, illustrated at approximately 25 PSIG. at point 387 in FIG. 17, the fill gun mandrel opens allowing the bead to introduced into the shell cavity, causing a momentary spike in pressure. After the first most distal zone is filled, the second set of vents open, at point in time 389, allowing filling to continue. The third set of vents at point in time 391. When the cavity is full of bead, the fill gun goes through a clear and close step causing a momentary spike in pressure as illustrated at time 393. During the filling process, the pressure is maintained at the desired fill pressure by regulating the outlet of the manifold using a vent valve controlled by the system controller 332. Once the fill gun is closed, the manifold is fully vented allowing all of the pins to vent.

Figure 18:
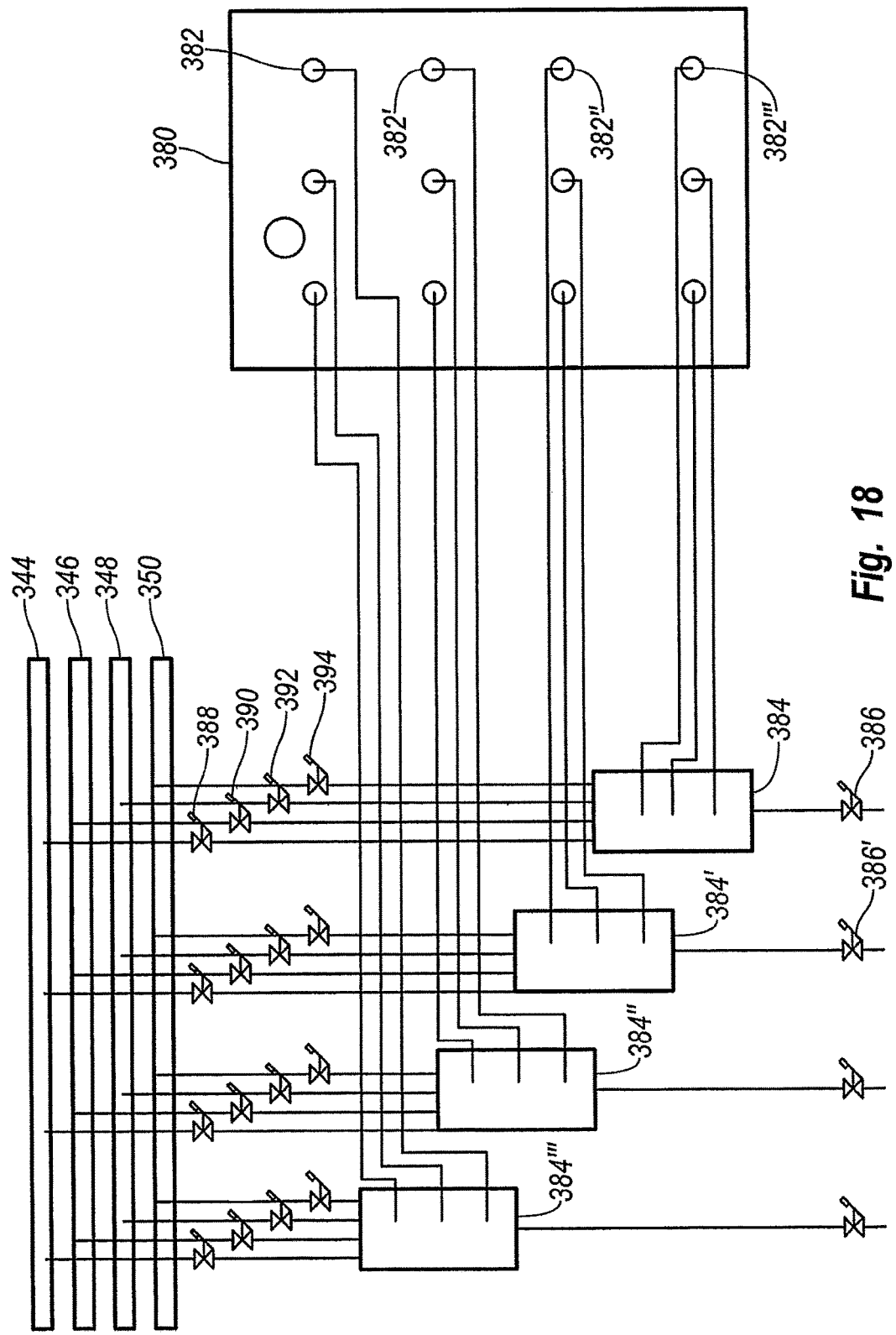
FIG. 18 is a more detailed schematic illustration of the array of steam pins in the mold and the associated manifolds and alternative connections to the air steam vacuum in vent lines.

For the purpose of illustration, FIG. 14 only illustrated two manifolds and a limited number of steam pins. A typical part will require more than two manifolds with a series of steam pins associated with each manifold. Each of these manifold are independently connectable to air, steam, vacuum and vent. FIG. 18 illustrates a mold for an elongate part having a substantial width such as a structural panel. The mold 380 is provided with 12 steam pins 382 oriented in four rows of three with each row representing a zone connected to one of four manifolds 384, 384', 384" and 384'''. Each of the manifolds has an outlet which is preferably located at its lower most point connected to a controllable valve 336 which is regulated by the foam core system controller 332. Each manifold has four inlets in the embodiment illustrated, connected to air source 334, steam source 346, vacuum source 348 and vent 350. As previously noted, it is possible to operate this system without a vacuum source utilizing the vent during the condensate removal process. The inlets in the manifolds are controlled independently by air valve 388, steam valve 390, vacuum valve 392 and vent 394, each operated by the foam core system controller. The corresponding valves for each of the manifolds are also independently controlled by the system controller in the preferred embodiment. Accordingly, a great deal of flexibility in the control of the foam core process is achievable.

One example of the process flexibility obtainable by the previously described structure is illustrated by the preferred steaming process. In order to minimize the amount of condensate introduced into the bead, prior to opening steam valve 346 to introduce steam into the manifold, the outlet valve 386 is opened allowing all of the condensate to drain from the manifold. When steam valve 390 is open, due to the relatively large size of the outlet opening in valve 386, steam will flow rapidly through the manifold and exit, removing any wet steam from the manifold and heating the manifold. Once hot the outlet valve 386 is rapidly closed causing steam to be injected into the bead through the associated steam pin needles. Each manifold is purged and preheated prior to each steaming operation, thereby maximizing the temperature and dryness of the steam introduced in order to heat the bead with the minimum amount of water, which in turn minimizes the amount of drying time necessary to remove the condensate.

Figure 19:
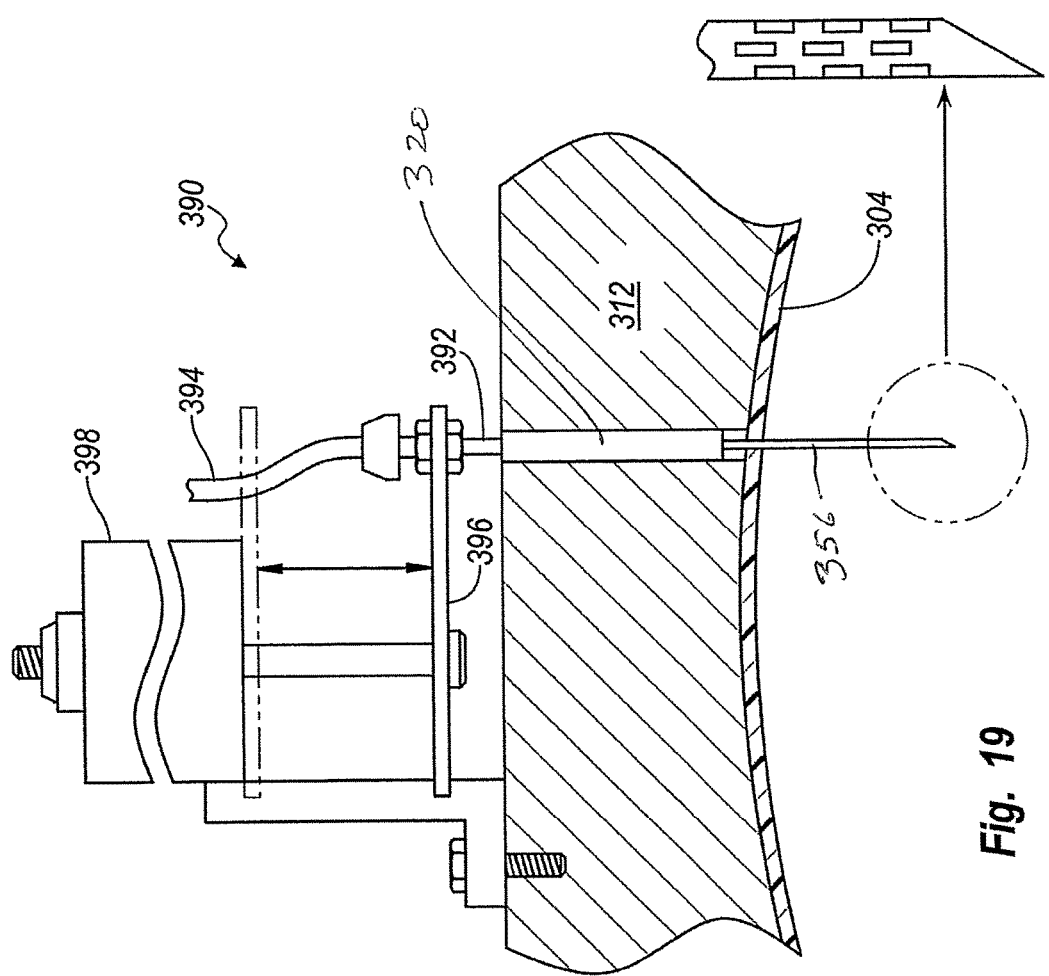
FIG. 19 is a cross-sectional view illustrating a steam pin actuator and an enlarged steam pin tip region.

Preferably, each of the steam pins is provided with a linear actuator to drive the steam pins in and out of the mold cavity. A representative steam pin actuator is illustrated in FIG. 19. Steam pin assembly 390 includes a needle 392 having a distal end which projects into the mold when extended and a proximate end connected to a steam line 394 which is coupled to the manifold. The steam needle 392 is affixed to a support plate 396 which can be shifted between a needle extended position as shown and a needle retracted position illustrated in dotted outline. The support plate 396 is linearly moved by a pneumatic double ended cylinder 398 between two adjustable stop positions. Cylinder 398 is mounted to the mold half 312 by support bracket as illustrated. The tip of the needle as illustrated in the exploded view, has a sharp point and a series of steam ports extending over the portion of the needle that extends through the wall of the plastic shell wall 304, preferably the steam ports in the needle wall end short of the shell 304 wall. Preferably, the steam needle 392 is made of relatively thin wall stainless steel in order to have good corrosion resistance and low thermal mass.

Figure 20:
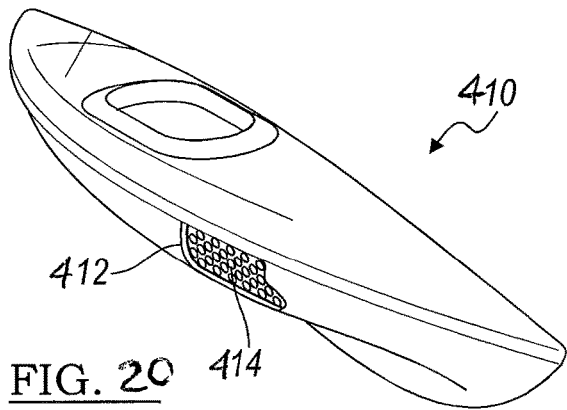
FIG. 20 schematically illustrates an isometric view of a water-going vessel according to at least one embodiment.

FIG. 20 schematically illustrates a water-going vessel 410, such as a sit-in kayak having a deck and a hull, a sit-on-top kayak or a one- or two-person watercraft. Water-going vessel 410 includes a wall 412 having a thermal bond to an in-situ foam core 414. In-situ foam core 414 is formed by fully expanding pre-expanded beads. The thermal bond includes a cooled joint formed from a molten and/or softened layer from wall 12 adjacent to a molten and/or softened layer of foam core 414, with an optional layer of intermingled portions of wall 412 layer and foam core 414 layer. It is understood that the optional layer may include a layer of distorted shape beads adjacent to the walls. It is understood that portions of other intermediate layers may be present in the thermal bond, such as a tie layer or a metal insert embedded in the article. A sit-in kayak will have a hull section and a deck which are molded separately bonded together. A sit-on-top kayak can be made as one piece.

In at least one embodiment, wall 412 thickness may range from 0.02 inches to 0.5 inches. In another embodiment, wall 412 thickness may range from 0.125 inches to 0.25 inches.

In at least one embodiment, in-situ foam core 414 thickness may range from 0.15 inches to 6 inches. In another embodiment, in-situ foam core 414 thickness may range from 0.2 inches to 4 inches. In another embodiment, in-situ foam core 414 thickness may range from 0.5 inches to 1 inch.

Wall 412, in at least one embodiment, is formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, wall 412 is a formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, wall 412 is formed of a composition of a polyolefin, including polypropylene and polyethylene, having a viscosity ranging from 1 grams/10 min to 30 grams/10 min.

In-situ foam core 414 in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other polymerizable monomers, such as ethylene-propylene copolymer, ethylene-vinyl acetate copolymer, ethylene-acrylic acid copolymer, ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core. In another embodiment, pre-expanded bead is result of the first expansion step where raw bead is expanded from 25% to 90% of the fully-expanded bead size.

A fluid for the second expansion step of the two-step expansion process for beads causes the pre-expanded beads to expand completely to form the fully expanded beads. Examples of the fluid include, but are not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO® EPP, has no external wall.

In at least one embodiment, in-situ foam core 414 density, after expansion by steam, ranges from 1 lb/ft$^3$ to 25 lbs/ft$^3$. In at least one embodiment, in-situ foam core 414 density ranges from 1.5 lbs/ft$^3$ to 15 lbs/ft$^3$. In at least one embodiment, in-situ foam core 414 density ranges from 2 lbs/ft$^3$ to 9 lbs/ft$^3$. In at least one embodiment, in-situ foam core 414 density ranges from 3 lbs/ft$^3$ to 6 lbs/ft$^3$.

In at least one embodiment, wall 412 with a range of 0.025 inch thickness to 0.1 inch thickness is comprised of a metallocene polypropylene. Such a combination is found to improve adhesion between wall 412 and in-situ core from 414 formed of EPP.

It is understood that each article disclosed herein may be recyclable.

Figure 21:
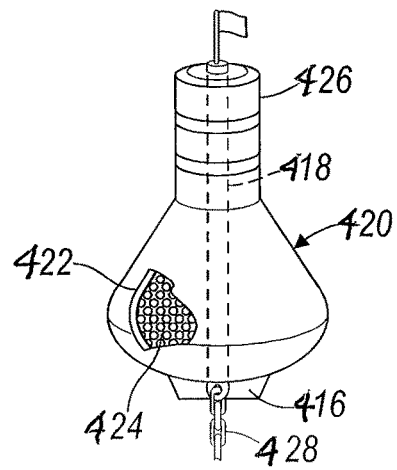
FIG. 21 schematically illustrates an isometric view of a buoy according to at least one embodiment.

Turning now to FIG. 21, a buoy 420 is schematically illustrated according to at least one embodiment. Buoy 420 includes a wall 422 and an in-situ foam core 424 having a thermal bond to wall 422 as schematically illustrated in a cut-away view. Buoy 420 optionally includes a light 426, an anchoring station 428, a molded-in-tube 418, and a ballast 416. If this buoy 420 should be struck by a vessel or debris puncturing wall 422, the lack of water uptake by in-situ foam core 424 means that the buoy 420 remains afloat. In-situ foam core 414 absorbs less than 1 weight percent water, in certain embodiments, correcting buoy deficiencies in previously made buoys. It is understood that each wall in each of the figures has the same range of embodiments as wall 412. It is further understood that each in-situ foam care in each of the figures has the same range of embodiments as in-situ foam core 414.

Figure 22:
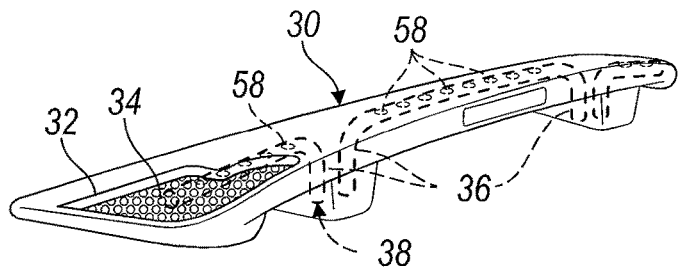
FIG. 22 schematically illustrates an isometric view of a spoiler for a vehicle according to at least one embodiment.

Turning now to FIG. 22, a spoiler 430 includes a wall 432 having a thermal bond to an in-situ foam core 434 according to at least one embodiment. Encapsulated by and helping to form in-situ foam core 434 is a tube 436 having a composition with sufficiently high melting temperature so as to resist melting in the steam and/or superheated steam. A non-limiting example of the composition is a polyamide composition.

Steam and superheated steam, in certain embodiments, especially those with show surfaces on all exterior surfaces, such as the spoiler, is injected into the spoiler 430 through an inlet of tube 436, which functions as a manifold and has a plurality of apertures 458 allowing steam or superheated steam into in-situ foam core 434 to cause the pre-expanded beads to fully expand forming foam core 434. Inlet 438, in certain embodiments, is suitable as a retention device for a fastener.

Figure 23:
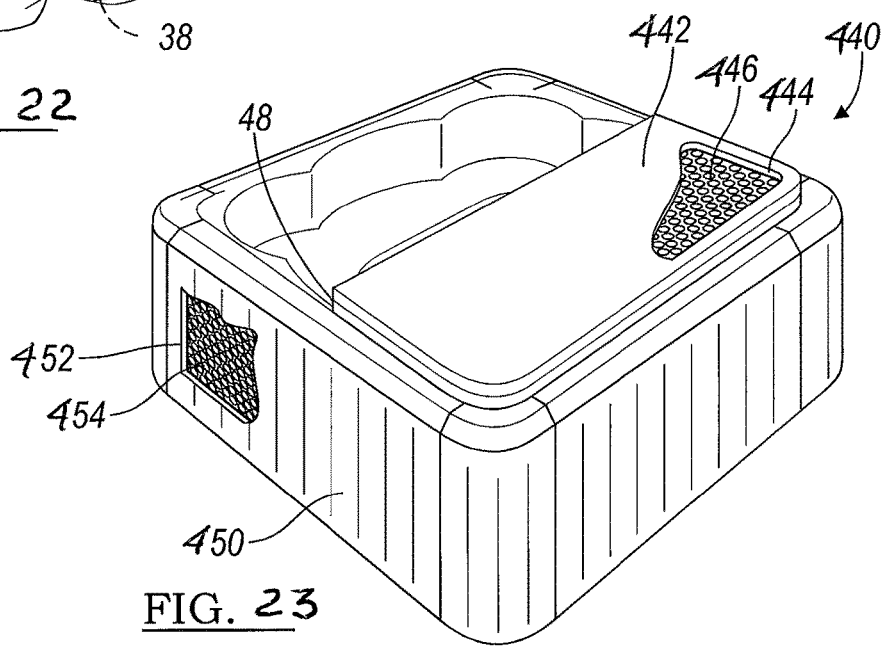
FIG. 23 schematically illustrates an isometric view of a hot tub system according to at least one embodiment.
Figure 24:
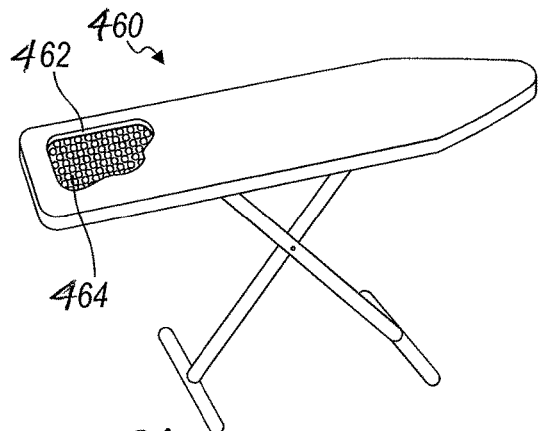
FIG. 24 schematically illustrates an isometric view of an ironing board according to at least one embodiment.

Turning now to FIG. 23, a hot tub system 440 is schematically illustrated according to at least one embodiment. Hot tub system 440 includes a top 442 including a wall 444 having a thermal bond to an in-situ foam core 446. Top 442 further includes a living hinge 448. Panel 450 supporting top 442 includes wall 452 having a thermal bond to an in-situ foam core 454. Top 442 is particularly desirable because of its initially lower weight relative to current systems, and its lack of absorption of water, which is limited to less than one weight percent of water in certain embodiments. In another embodiment, in-situ foam cores 446 and/or 454 absorb less than 0.5 wt. % water. It is understood that while a hot tub system 440 is illustrated, other water containing articles, such as but not limited to, a spa, shower, a bathtub and an interior insert 456 to the hot tub system 440 are contemplated.

Turning now to FIG. 424, an ironing board 460 is schematically illustrated according to at least one embodiment. Ironing board 460 includes wall 462 having a thermal bond to an in-situ foam core 464.

Figure 25:
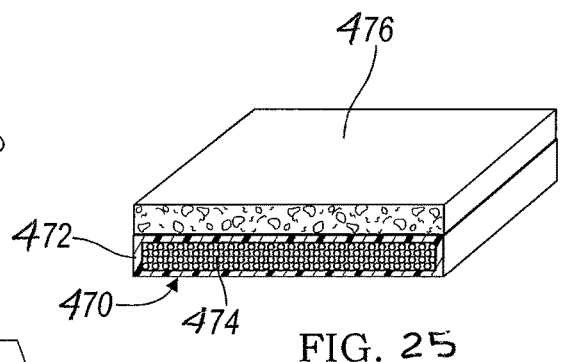
FIG. 25 schematically illustrates an isometric cross-sectional view of a precast floor support according to at least one embodiment.

Turning now to FIG. 25, a precast floor support 470 includes a wall 472 and an in-situ foam core 474 having a thermal bond to wall 472. During construction of many buildings, recently, precast floor support 470 would receive a layer of light weight concrete 476 to form a floor, such as a mezzanine floor. Precast floor support 470, in at least one embodiment, exhibits creep of 0.5% to 3.5% when measured at 1000 hr according to ASTM D-3575 when in-situ foam core 474 density ranges from 1.0 to 5.0 lbs/ft$^3$.

In at least one embodiment, preexpanded comprise homopolymer composition pre expanded beads, in order to increase the stiffness of in-situ foam core 474. As a non-limiting example, when the homopolymer beads are a homopolymer polypropylene, the stiffness increases such that a 100,000 lb load yields a 5.8% strain and a compression of only 0.007 inches. In another example, the strain ranges from 2% strain to 10% strain.

In at least one embodiment, precast floor support 470 yields surprising savings because it is such a good thermal insulator that the users no longer need to add additional layers of insulation for energy usage reduction. In at least one embodiment, precast floor support 470 has a u-value of less than 0.17. In another embodiment, precast floor support 470 has a u-value of less than 0.145.

Figure 26:
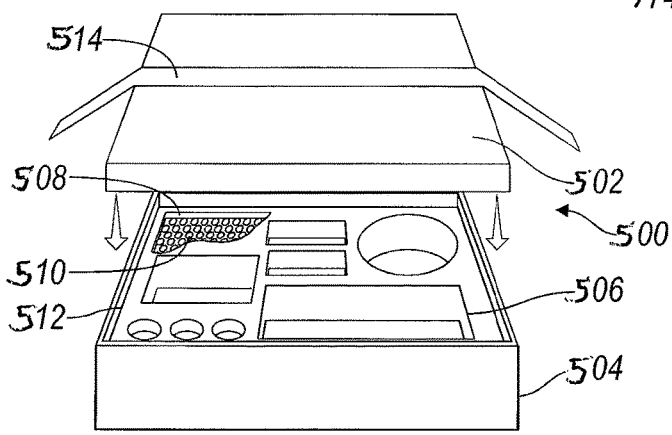
FIG. 26 schematically illustrates an isometric view of a class IX shipping container according to at least one embodiment.

Turning now to FIG. 26, an International Air Transport Association (IATA) class IX shipping container 500 is schematically illustrated according to at least one embodiment. Class IX shipping container 500 includes a top 502 and a bottom 504. Bottom 504 has a plurality of embossments 506 formed with a wall 508 having a thermal bond to an in-situ foam core 510 to wall 508 as illustrated in the cut-away section. At least one of top 502 and bottom 504 includes a sealing gasket 512. Optionally, one or more securing bands 514 may be applied to further secure top 502 to bottom 504.

In at least one embodiment, in-situ foam core 510 and/or wall 508 comprises a non-conductive divider. In at least one embodiment, the non-conductive divider surface resistance maximum is greater than $10^{12}$ ohm per square; where surface resistance is the inverse measure of conductivity when measured to standard ANSI/ESD-S 20.20-1999. In another embodiment, in-situ foam core 510 and/or wall 508 prevent electrostatic discharge. In at least one embodiment class IX shipping container 500 is suitable for airborne cartage of primary non-rechargeable batteries, such as lithium metal batteries, and/or rechargeable batteries, such as lithium ion batteries. It should be understood that in at least one embodiment, in-situ foam core 510 and wall 508 comprise an IATA Class VIII shipping container suitable for corrosive materials.

Figure 27:
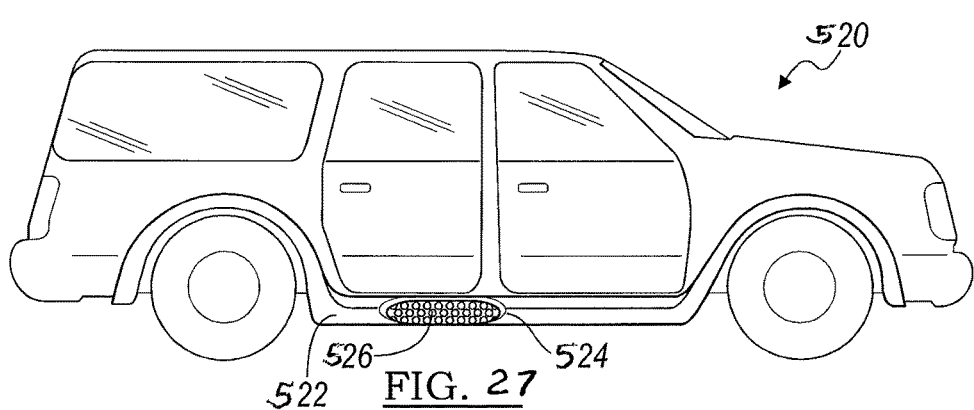
FIG. 27 schematically illustrates an isometric view of a running the board for use with a vehicle according to at least one embodiment.

Turning now to FIG. 27, a running board 522 is schematically illustrated according to at least one embodiment as attached to a vehicle 520. Running board 522 includes wall 524 having a thermal bond to an in-situ foam core 526. Running board 522 reduces the weight of a vehicle running board by at least 30% relative to current running boards, while retaining structural strength. It is understood that while a van vehicle is illustrated, running board 522 may be used for a passenger truck, a class 6-8 tractor cab, a mower, a mining vehicle, and other suitable vehicles where the first step is at least 6" or more above the ground. It is also understood that while running board 522 is illustrated as fixed, a retractable and/or deployable running board or vehicle step is contemplated. Further, it should be understood that running board 522 may comprise a ramp system for a van accessible vehicle for use by handicapped people.

Figure 28:
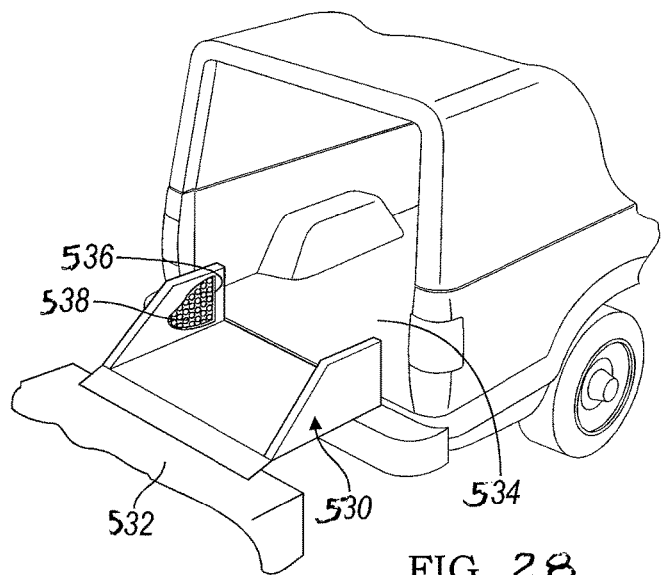
FIG. 28 schematically illustrates an isometric view of a ramp of for use in loading a vehicle according to at least one embodiment.

Turning now to FIG. 28, a ramp 530 is schematically illustrated according to at least one embodiment. Ramp 530 permits wheeled carts to traverse a gap between a loading dock 532 and a vehicle 534. Ramp 530 includes a wall 536 having a thermal bond to an in-situ foam core 538. Ramp 530 reduces the weight by at least 25 pounds relative to current metal and/or wood ramps, which makes it more ergonomically desirable for vehicle drivers who must position the ramp at each stop.

Figure 29:
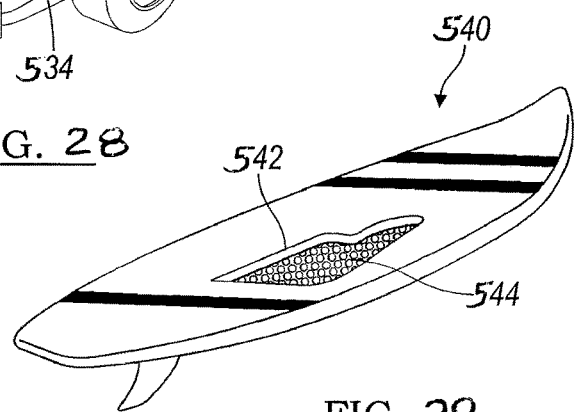
FIG. 29 schematically illustrates an isometric view of a surfboard according to at least one embodiment.

Turning now to FIG. 29, a surfboard 540 is schematically illustrated according to at least one embodiment. Surfboard 510 includes wall 542 having a thermal bond to in-situ foam core 544. It should be understood that while surfboard 540 is illustrated, is exemplary of other similar boards, such as a sail board, a small sailboat, and a skateboard deck.

Figure 30:
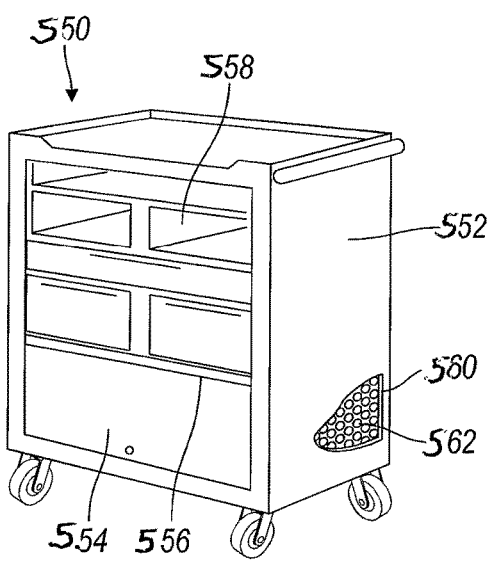
FIG. 30 schematically illustrates an isometric view of a roll-around cart according to at least one embodiment.

Turning now to FIG. 30, a roll-around cart 550 is illustrated according to at least one embodiment. Roll around cart 550 includes a panel 552, an optional embossment 558, and an optional lockable door 554. Lockable door 554 includes a living hinge 556. Panel 552 includes wall 560 having a thermal bond to an in-situ foam core 562.

Figure 31:
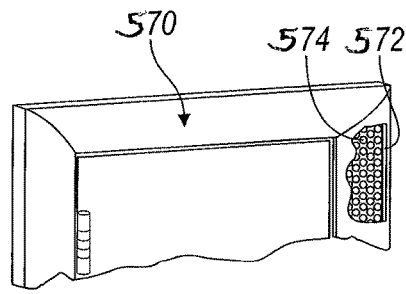
FIG. 31 schematically illustrates an isometric view of a moulding for use with a building according to at least one embodiment.

Turning now to FIG. 31, a molding 570, such as a door jamb or a window frame is schematically illustrated according to at least one embodiment. Molding 570 includes a wall 572 having a thermal bond to an in-situ foam core 574. Molding 570 is significantly more stable in terms of thermal expansion and construction than current PVC frames. Molding 570 has a thermal expansion coefficient less than $5 \times 10^{-6}$ in/in/° F.

Turning now to FIGS. 32, 33 and 34 a highway bumper system, such as, but not limited to, plastic structural articles including a highway guard rail end terminal 580, a jersey wall 586, and a V-shaped barrier 592, are schematically illustrated in an isometric view according to at least one embodiment. In FIG. 32, highway guard rail end terminal 580 is an impact attenuator and includes a wall 582 having a thermal bond to an in-situ foam core 584. In at least one embodiment, the end terminal 580 may have a plurality of slots arranged in a staggered or an offset pattern of slots 598 with bolts 608 mounted to a guard rail 612 having a support 614 to ground providing a sliding resistive force sufficient to stop a 70 mph vehicle in less than 10 seconds. The foam core energy absorption capacity and foam core damping response surprisingly, in at least embodiment, with slots 598 creates an essentially square wave of energy absorption. In at least one embodiment, the highway bumper system ultimately compresses less than 25% when struck at 70 mph by a 3000 lb. vehicle.

In at least one embodiment, highway bumper system includes a energy absorbing bumper 616 disposed between guard rail 612 and support 614. Bumper 616 includes a wall 618 having a thermal bond 642 to an in-situ foam core 644

In FIG. 33, V-shaped barrier 592, in at least one embodiment, is disposed on ground, and includes a wall 594 having a thermal bond to an in-situ foam core 594. The V-shaped barrier 592 is a device for absorbing the energy of a vehicle and protecting the same in the event of a collision with a relatively immovable hazard along a highway such as a bridge abutment. It is understood that while the V-shaped barrier 592 is illustrated, other shapes such as a torroid, may be used in other embodiments without exceeding the scope or spirit of the embodiments. In addition, it is also understood that the V-shaped barrier 592 may be combined with other energy absorbing components such as flexible annular rings, for a non-limiting example, a plurality of tires, without exceeding the scope and spirit of the embodiments.

In FIG. 34 jersey wall 586, in at least one embodiment, includes a wall 588 having a thermal bond to an in-situ foam core 588. In another embodiment, jersey wall 586 may include a connector 606, such as J-J hook or U-channel embedded in at least one end in order to facilitate joining multiple jersey walls together to form a barrier wall. In at least embodiment, the foam core 588 provides jersey wall 586 with sufficient structural mechanical strength and energy damping to pass NCHRP-350 Level TL-2 and TL-3, as well as European Containment Level Test with a test rating of H2, and a European Containment rating at levels T1, T2, and T3. It is understood that while a jersey barrier-type shape is illustrated, other shapes, such as an F-shape and a Constant Slope shape, are contemplated within the scope and spirit of the invention. Jersey wall 586 is significantly lighter than conventional precast concrete barriers reducing the amount of labor and capital equipment necessary to install the barrier. In at least one embodiment, jersey wall 586 is sufficiently portable that it can be used to protect workers on the roadway and provide a warning function, such during nighttime closures, and then be economically removed by a 2×4 wheel drive pickup truck on a daily basis, such as at the end of the work shift, effectively replacing the highway orange barrels currently used. The highway orange barrels provide the warning function to drivers, but do not significantly inhibit drivers from entering the work zone, thereby possibly endangering workers on the roadway.

Turning now to FIG. 14, a playground equipment component, such as a playground slide 200 is schematically illustrated in an isometric perspective view according to at least one embodiment. Playground slide 600 includes a wall 602 having a thermal bond to an in-situ foam core 604. Playground slide 600 is another embodiment of a plastic structural article. It is understood that while a playground slide 600 is illustrated, other typical structural playground articles, such as, but not limited to, a teeter-totter and components of playground equipment, especially tubular, rectangular, or square cross-sectional components having spans in excess of 2 meters with cross-section maximum dimensions of 10 mm or suitable sizes for young children's hands are contemplated with the scope and spirit of the embodiments of the invention.

Turning now to FIG. 36, a storage shed 620 is schematically illustrated in an isometric view according to at least one embodiment. Storage shed 620 includes components such as a roof panel 622 having a wall 624 having a thermal bond to an in-situ foam core 626. Storage shed 620, in certain embodiments, has roof panel 622 with a minimum flat dimension exceeding 3 feet, where a-foot span is the standard maximum for conventionally constructed shed roof panels. In another embodiment, storage shed 620 roof panel 622 has a minimum flat dimension equal to or exceeding 4 feet. In another embodiment, the storage shed 620 roof panel 622 has a minimum area of 4 foot by 8 foot, that when in clear span width, has a maximum sag of 0.75" relative to the horizontal plane of the panel. In yet another embodiment, the storage shed 620 roof panel 622 has a minimum area of 4 foot by 8 foot, that when in clear span width, has a maximum sag of 0.25" relative to the horizontal plane of the panel. In yet another embodiment, the storage shed 620 roof panel 622 has a minimum area of 4 foot by 8 foot, that when in clear span width, has a maximum sag of 0.35" relative to the horizontal plane of the panel when tested at 90° C.

In at least one embodiment, storage shed 620 has a segmented door 628 and roof panel 622 and is certified to resist hurricane force winds in excess of a design pressure rating exceeding DP30. In another embodiment, storage shed 620 has a double door 628 and roof panel 622 and is certified to resist hurricane force winds in excess of a design pressure rating exceeding DP40. In yet another embodiment, storage shed 620 has a door 628 and roof panel 622 and is certified to resist hurricane force winds in excess of a design pressure rating of DP50. In at least one embodiment, segmented door 628 includes a plurality of profiles 630 having a wall 632 and an in-situ foam core 634 having a thermal bond 636 bonding wall 632 and in-situ foam core 634.

In at least one embodiment, storage shed 620 in anchored by a footer 650 of a cementious composition which encapsulates a base 654 which interlocks with a wall panel 652 of storage shed 620. Wall panel 652 includes a hook attachment 656 rolls into lock with a retention member 658 of base 654.

FIGS. 37A-37E schematically illustrate a method of producing a plastic structural article having an in-situ foam core according to at least one embodiment. Regarding FIG. 37A, has a nozzle 712 containing a molten polymer composition 714. Molten polymer composition 714 is injection molded into a mold 716 having a first mold portion 718 and a second mold portion 720. The first and second mold portions 718 and 720, respectively, define a cavity 722 within the mold 716 into which molten polymer composition 714 is being injected through at least one sprue 724.

Figure 37A:
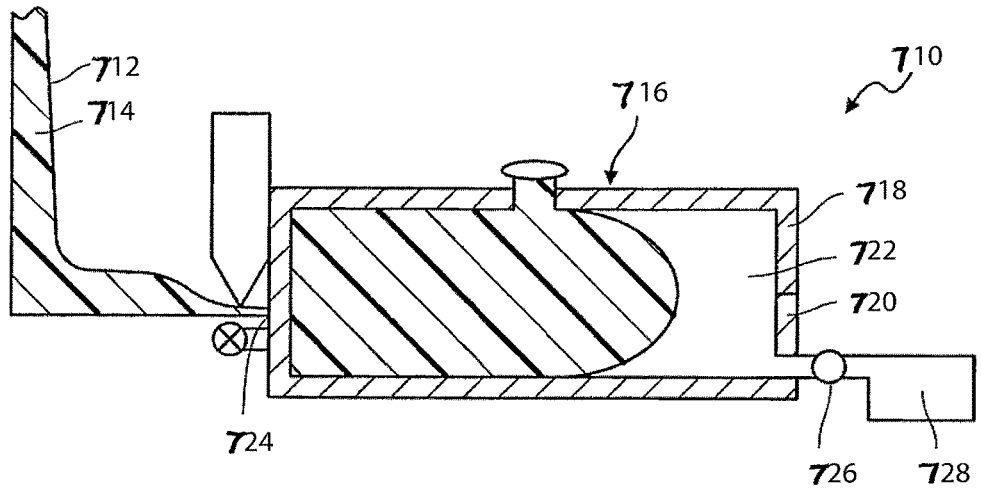
FIG. 37A-37E schematically illustrates a method of producing an article having an in-situ foam core according to at least one embodiment.
Figure 37B:
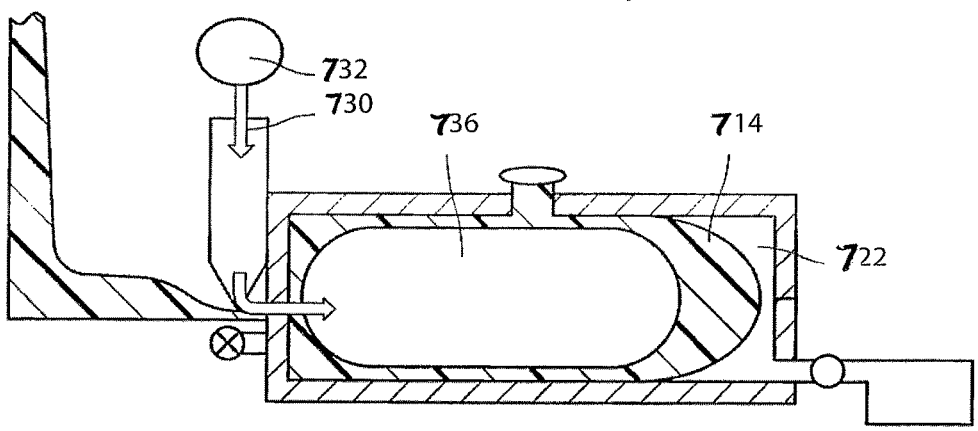

FIG. 37B includes having a fluid 730 from a fluid source 732 enter mold cavity 710 which is now, at least, partially filled with molten polymer 714 by pushing molten polymer 714 towards the walls of mold 716. When molten polymer 714 is pushed completely to the wall of mold 716 by the fluid 730 in FIG. 37C, a cavity 736 is formed inside the injection molding shot of molten polymer 714 and excess molten polymer 714 is displaced into a spillover trap 728 through valves 26 (FIG. 37A). Fluid 730 cools molten polymers 714 sufficiently such that a hollow article 746 is self-supporting. Fluid 730 is removed from cavity 736 through a vent 734. Vent 734 is subsequently closed.

Figure 37C:
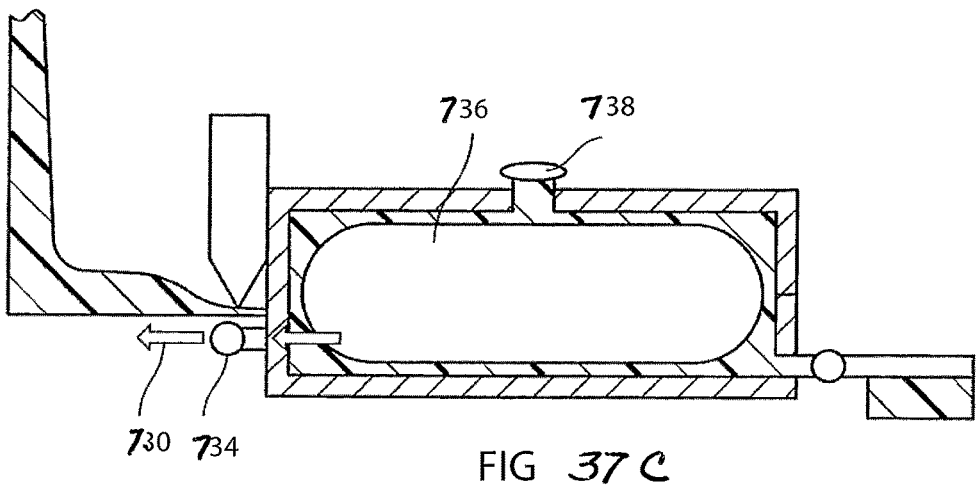

The steps of FIGS. 37A-C are illustrated by U.S. Pat. No. 6,375,892 which is incorporated herein by reference.

Figure 37D:
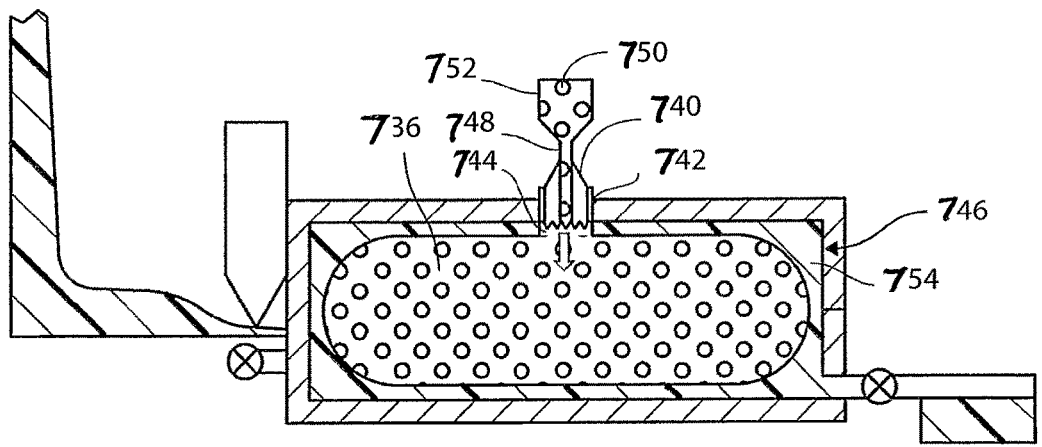

FIG. 37D has a port cap 738 (FIG. 37C) removed and includes a rotary cutter 740 that passes through a mold port 742 cutting an aperture 744 in a wall 754 of the hollow article 746. Rotary cutter 740 withdraws from aperture 744 and a bead dispenser 748 enters aperture 744. Valve 726 is closed.

In FIG. 37D, pre-expanded beads 750 are dispensed from a bead source 752 to bead dispenser 748 and from bead dispenser 748 into cavity 736 of hollow article 746. Bead dispenser 748 withdraws from aperture 744. It is understood that pre-expanded beads 750 may be compressed during dispensing.

Figure 37E:
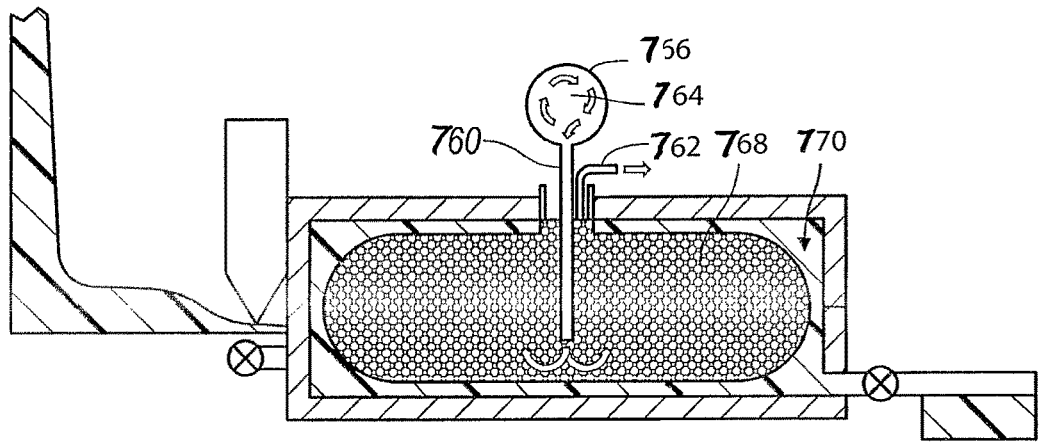

In FIG. 37E, a steam pin 760 and a steam vent 762 are inserted into aperture 744. Steam 764 from steam source 766 is injected into cavity 736 causing rapid expansion of pre-expanded beads 750 which tightly pack cavity 736 forming an in-situ foam core 768 having a thermal bond to wall 754. A plastic structural article 770 having a skin 772 formed of a cooled polymer and in-situ foam core 768 is released from mold 716 by separating the first mold portion 718 from the second mold portion 720.

The steps of FIGS. 37D-E are illustrated by U.S. patent application Ser. Nos. 13/358,181, 13/005,190, and 12/913,132 all of which are incorporated herein by reference.

Figure 38:
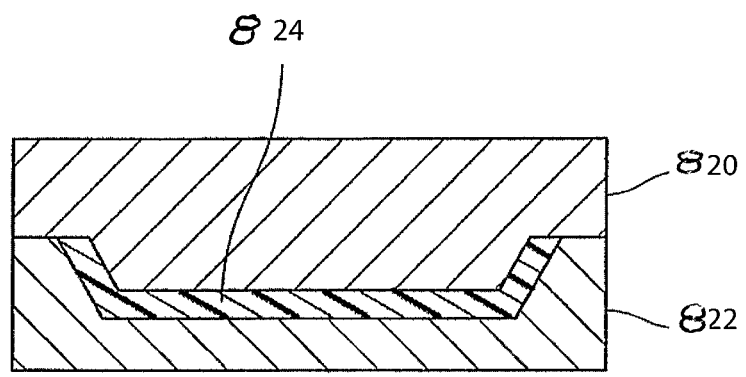
FIG. 38A-38E schematically illustrates a method of producing an article having an in-situ foam core according to at least one other embodiment.
Figure 38:
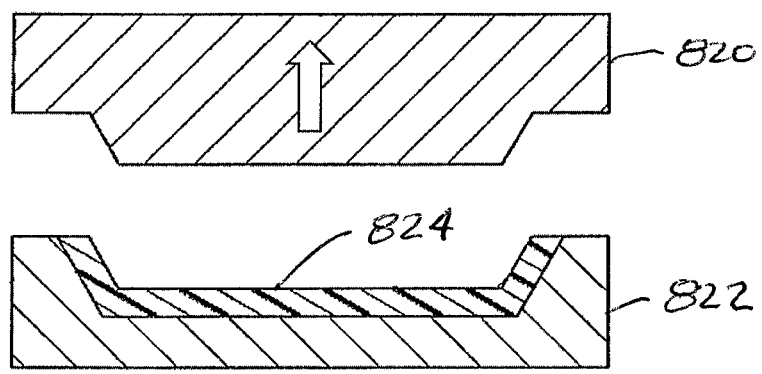

Turning now to FIG. 38A, an injection-molded part 824 is formed between a first mold portion 820 and a second mold portion 822 by any injection-molding method known in the art.

Figure 38C:
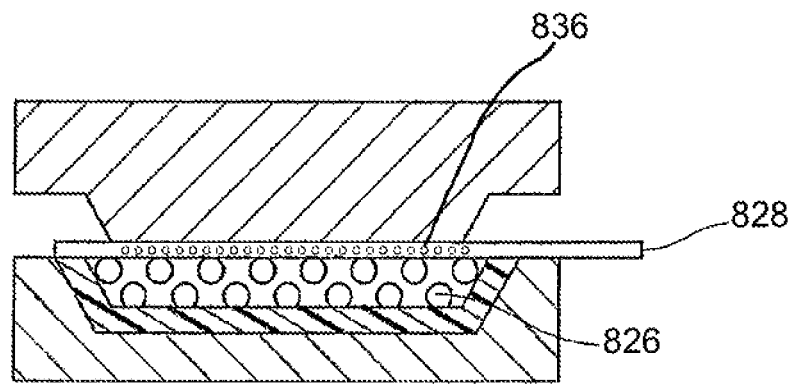

In FIG. 38B, first mold portion 820 is raised to allow insertion of pre-expanded beads 826 and a tube 828, as shown in FIG. 38C. Tube 828 is comprised of a material having a sufficiently high melting point that tube 828 will not melt when exposed to steam or superheated steam. Tube 828 has small apertures 836 capable of permitting steam or superheated steam to infiltrate pre-expanded beads 826.

Figure 38D:
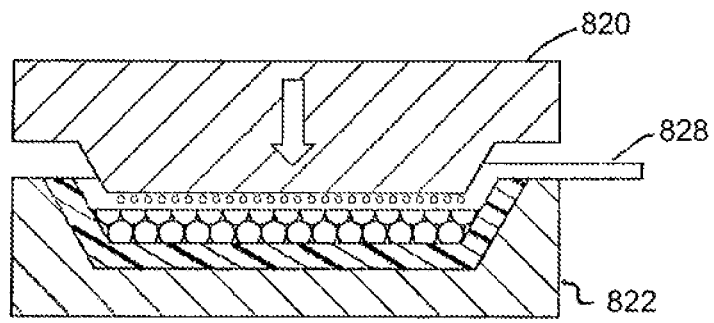
Figure 38E:
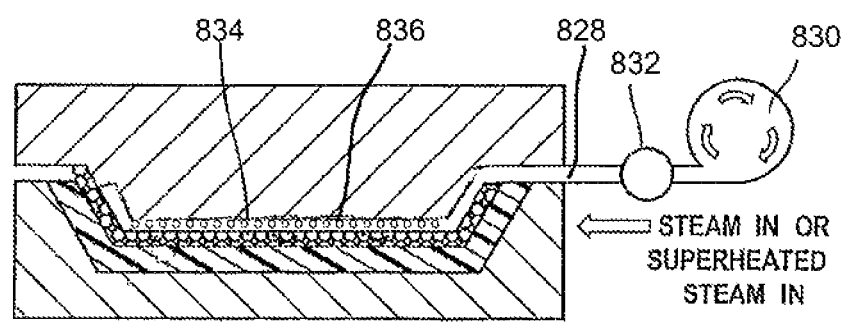

In FIG. 38D, first mold portion 820 is closed, thereby compressing pre-expanded beads 826 and tube 828. In FIG. 38E, steam or superheated steam from steam source 830 passes through valve 832 which is connected to tube 828. Steam interacts with the pre-expanded beads 826, thereby expanding pre-expanded beads 826 to fully expanded beads forming in-situ foam core 834. In-in situ foam core 834 is thermally bonded to injection-molded part 824. Injection-molded part 824 and in-situ foam core 834 comprise a structural plastic article, which can be removed from between first mold portion 820 and second mold portion 822 when at least one of the mold portions separates from the other.

Figure 39:
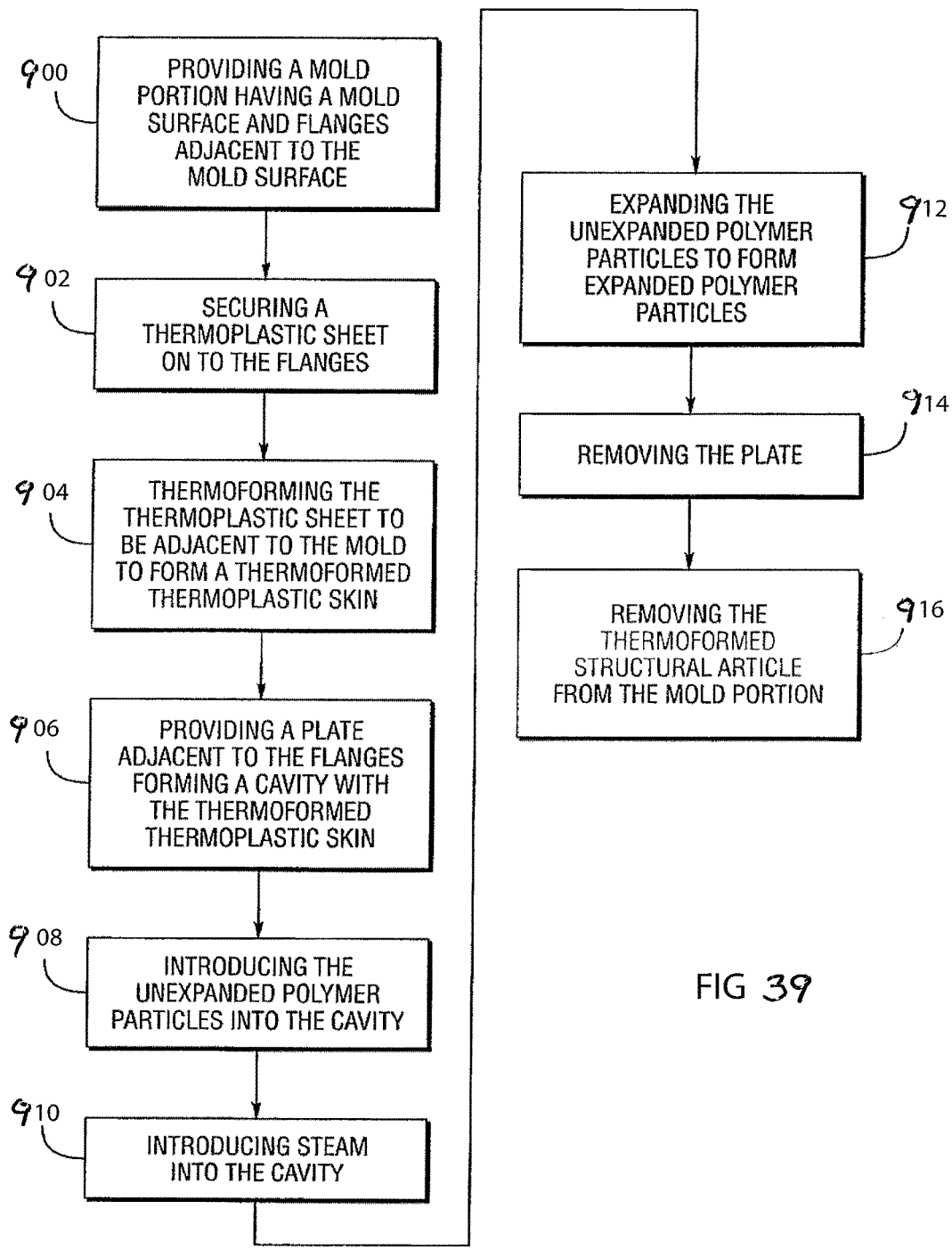
FIG. 39 diagrammatically illustrates a method of producing an article having an in-situ foam core according to another embodiment.

At least one embodiment illustrated in FIG. 39, in step 900 a method for manufacture of an article having one plastic layer includes providing a mold portion having a mold surface and flanges adjacent to the mold surface. A plastic sheet having a thermoplastic composition is secured to the flanges in step 902. In step 904 the thermoplastic sheet is thermoformed to be adjacent to the mold surface to form a thermoformed thermoplastic skin. A plate is situated adjacent to the flanges forming a cavity with the thermoformed thermoplastic skin in step 906. In step 908, unexpanded and/or pre-expanded polymer particles are introduced into the cavity when the pressure in the cavity is at least 30 pounds per square inch less than the pressure exerted on the unexpanded and/or pre-expanded polymer particles. During introduction, the unexpanded and/or pre-expanded particles are compressed by more than 10 vol %. The unexpanded and/or pre-expanded particles, in certain embodiments, rebound in size by at least 5 vol. % to approximately their original volume before introduction. In certain embodiments the particles may rebound to exceed their original volume. In step 910, steam is introduced into the cavity causing the unexpanded polymer particles to expand to form expanded polymer particles in step 912. Once the particles have substantially stopped expanding, the plate is removed in step 914. In step 916, the thermoformed structural plastic article is removed from the mold portion. The structural plastic article includes a plastic layer bonded to expanded polymer particles. The bonding occurs during the steps 910 through 912 when the polymer particles are expanding using steam to form an in-situ core with the plastic layer.

Figure 40:
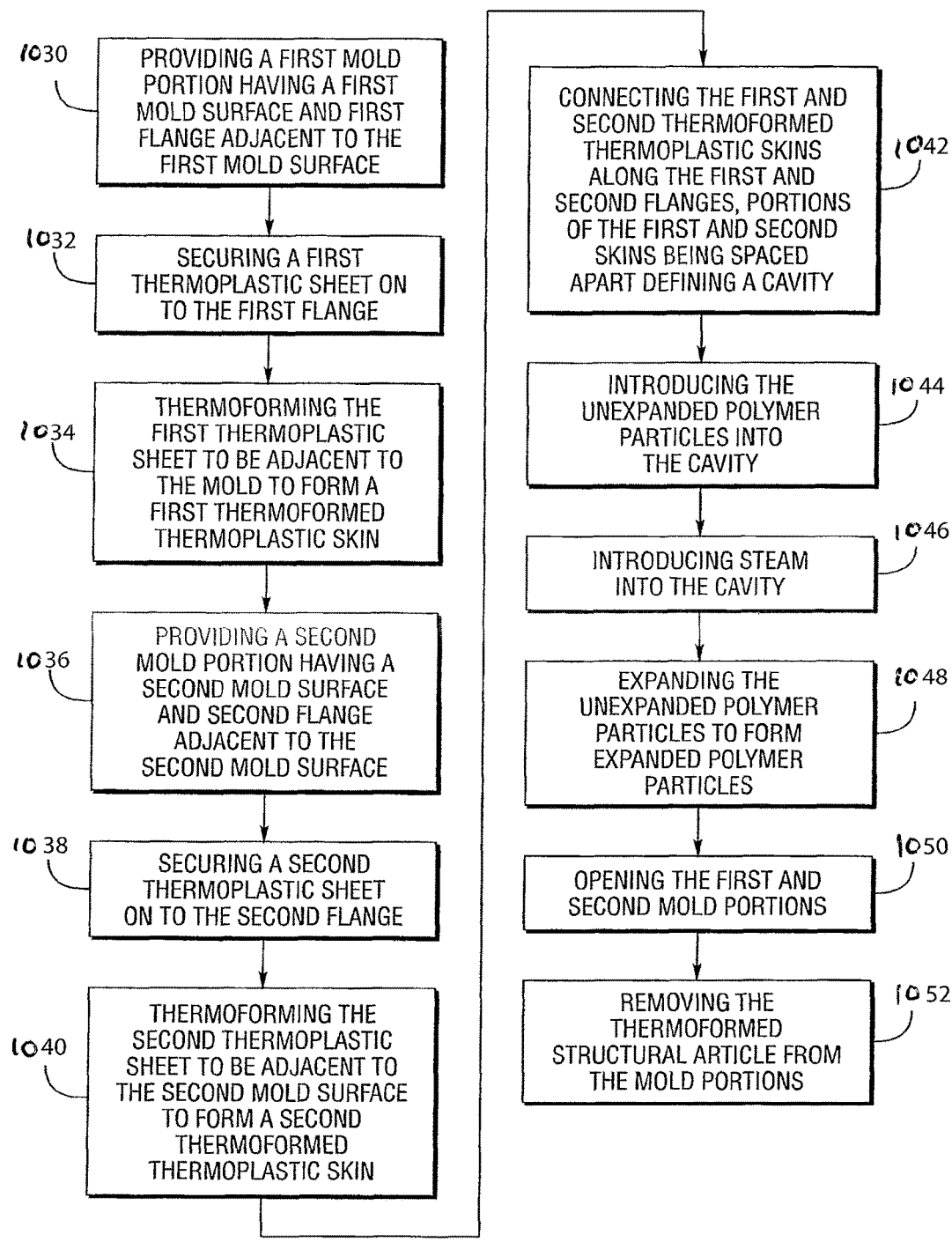
FIG. 40 diagrammatically illustrates a method of producing an article having an in-situ foam core according to another embodiment.

Referring now to FIG. 40, a method is recited for forming an article using twin sheet thermoforming skins with the expanding foam core. In step 1030 a first mold portion having a first mold surface and first flanges adjacent to first mold surface is provided. In step 1032, a first thermoplastic sheet is secured to the first flange. In step 1034, the first thermoplastic sheet is thermoformed adjacent to the mold to form the first thermoformed thermoplastic skin.

In step 1036, a second mold portion having a second mold surface and second flange adjacent to the second mold surface is provided. In step 1038, a second thermoplastic sheet is secured on to the second flange. In step 1040, the second thermoplastic sheet is thermoformed to be adjacent to the second mold surface to form a second thermoformed thermoplastic skin.

The first and second thermoformed thermoplastic skins are connected along the first and second flange in step 1042, closing the mold. Portions of the first and second skins are spaced apart defining a cavity. In step 1044, unexpanded polymer particles are introduced into the cavity. In step 1046, steam is introduced into the cavity. The unexpanded polymer particles expand to form expanded polymer particles in step 1048. After the polymer particles cease substantially to expand, the first and second mold portions are opened. In step 1052, the thermoformed structural plastic article is removed from the mold portions.

It is understood that unexpanded polymer particles may include partially expanded polymer particles. It is also understood that the polymer particles may cease substantially to expand when the pressure in the mold in certain embodiments is 0.5 lbf/in² or less. In other embodiments, the pressure in the mold when the polymer particles may cease to expand substantially may range from 0.1 lbf/in² to 1 lbf/in².

Figure 41:
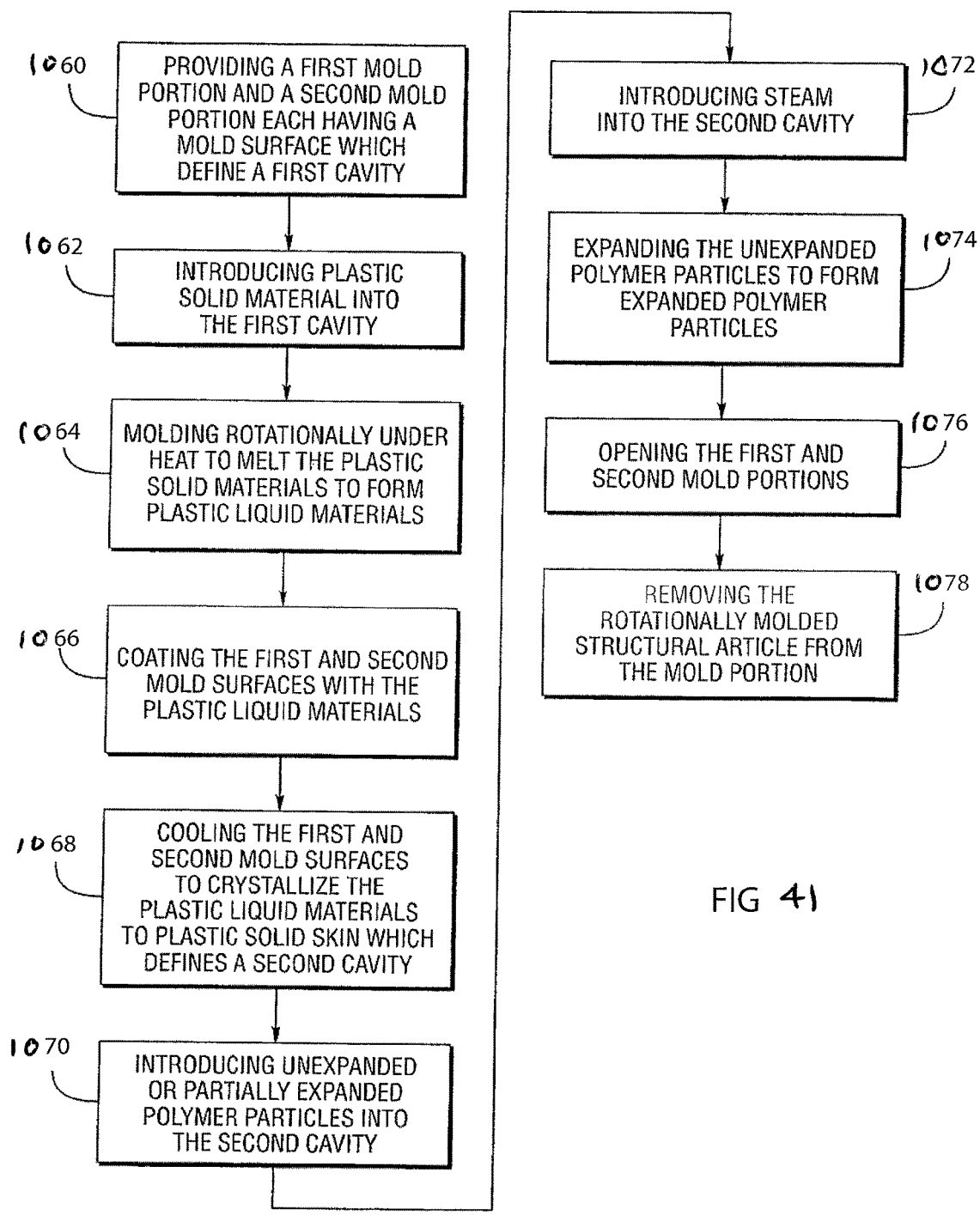
FIG. 41 schematically illustrates a method of producing an article having an in-situ foam core according to another embodiment.

In FIG. 41, another embodiment of a method of manufacture of the structural plastic articles is disclosed. In step 1060, a first mold portion and a second mold portion each having a mold surface are provided. The two mold surfaces define a first cavity. In step 1062, a plastic solid material is introduced into the first cavity. In step 1064, the plastic solid material is molded rotationally under heat to melt the plastic solid to form plastic liquid materials. In step 1066, the liquid plastic materials coat the first and second mold surfaces. In step 1068, the first and second mold surfaces are cooled to crystallize the plastic liquid materials to plastic solid skin which defines a second cavity. In step 1070, unexpanded or partially expanded polymer particles are introduced into the second cavity. In step 1072, steam is introduced into the second cavity. In step 1074, the unexpanded polymer particles are expanded by the steam to form expanded polymer particles. When the expansion of the polymer particles has substantially ceased, the first and second mold portions are opened in step 1076. In step 1078, the rotationally molded structural plastic article is removed from the mold portion. It should be understood, that curable plastic materials may be introduced in step 1062 as a substitute for the plastic solid materials without exceeding the scope or spirit of the embodiment. It is also understood, that some liquid materials in certain embodiments, will require little or no heat beyond the ambient room temperature to begin curing the plastic liquid materials to crystallize or otherwise solidify the plastic liquid material in step 1068. It is also understood that rotationally molding the structural plastic article may use processes such as rotational molding or rotocasting.

Figure 42:
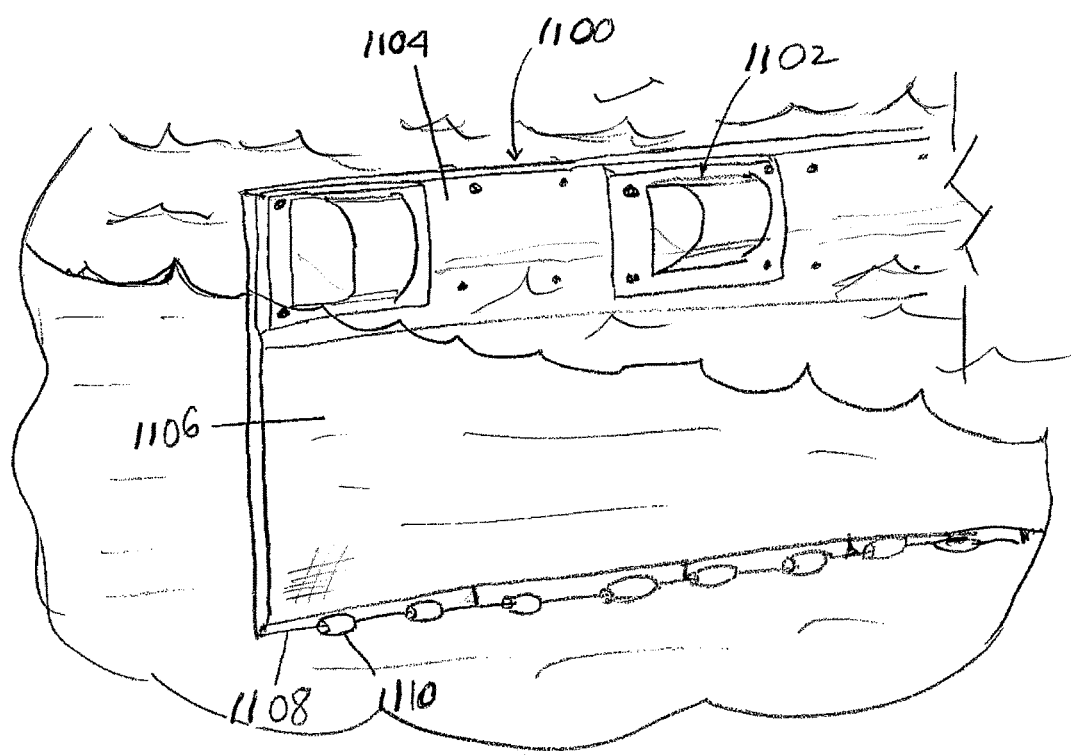
FIG. 42 schematically illustrates a fragmentary isometric view of an oil containment system according to at least one embodiment.

FIG. 42 schematically illustrates an oil containment boom 1100 according to at least one embodiment. Boom 1100 includes a flotation chamber 1102 connected to a freeboard 1104. Freeboard 1104 is also connected to a skirt 1106 that is draped into the water 6-10 feet. Skirt 1106 is connected at the end opposite the freeboard 1104 to a tension member 1108. Tension member 1108 supports a ballast member 1110 which aids in keeping skirt 1106 positioned upright in the water. Chambers 1102 can be located on one side or both sides of freeboard 1104.

Figure 43:
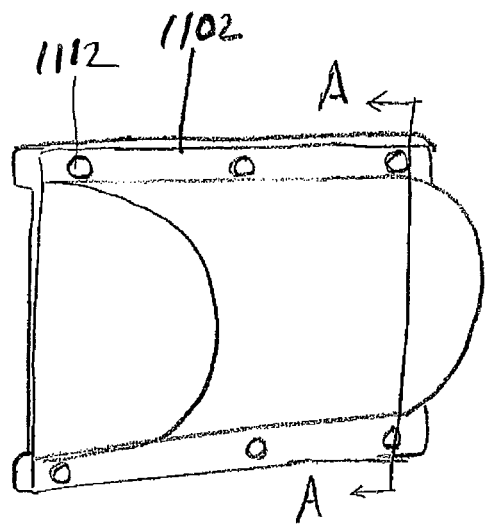
FIG. 43 schematically illustrates an oil containment system flotation chamber.

FIG. 43 schematically illustrates flotation chamber 1102. A plurality of flotation chambers 1102 are connected by fasteners through a plurality of apertures 1112 in an alternating configuration to opposite sides of freeboard 1104 in at least one embodiment. In another embodiment, the plurality of flotation chambers 1102 are connected to one or more sides of the freeboard in order to provide sufficient buoyancy to keep freeboard 1104 approximately upright in heavy swells at sea.

Figure 44:
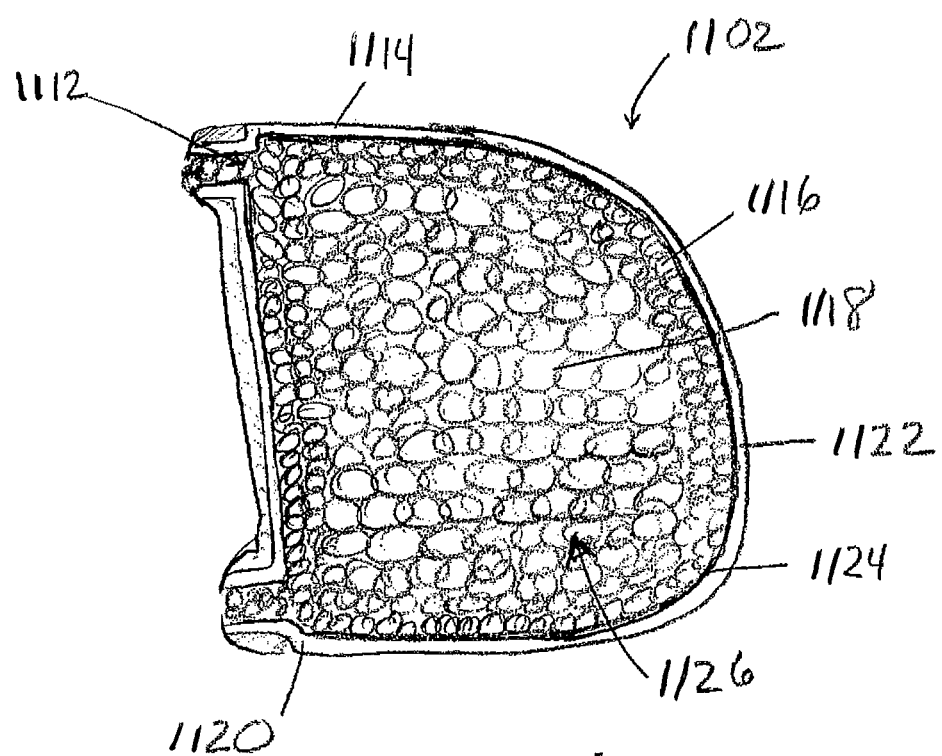
FIG. 44 schematically illustrates a cross-sectional view of an oil containment system flotation chamber along axis A-A of FIG. 43.

FIG. 44 schematically illustrates a cross-sectional view along axis A-A of FIG. 42. Flotation chamber 1102 includes a wall 1114 having a thermal bond 1124 to an in-situ foam core 1126. Thermal bond 1124 includes a cooled connection having a molten or softened portion of wall 1114, a molten or softened portion of in-situ foam core 1126, and a co-mingled layer including wall 1114 and in-situ foam core 1126. In-situ foam core 1126 includes a first density zone 1116 having a greater density than a second density zone 1118. Second density zone provides greater buoyancy is especially advantageous in seas with high waves or when an oil containment boom 1100 is above average booms in weight. Apertures 1112 can also experience extra stresses. In at least one embodiment, the blowmolding parison is fed more slowly or with more material into areas so as to increase the wall thickness in higher stress areas, such as area 1120.

It should be understood that other embodiments may use a heating medium other than steam without exceeding the scope of contemplated embodiments. It is further understood that the expanded polyolefin may be formed using a heating medium in cooperation with a blowing agent, such as pentane.

Figure 45:
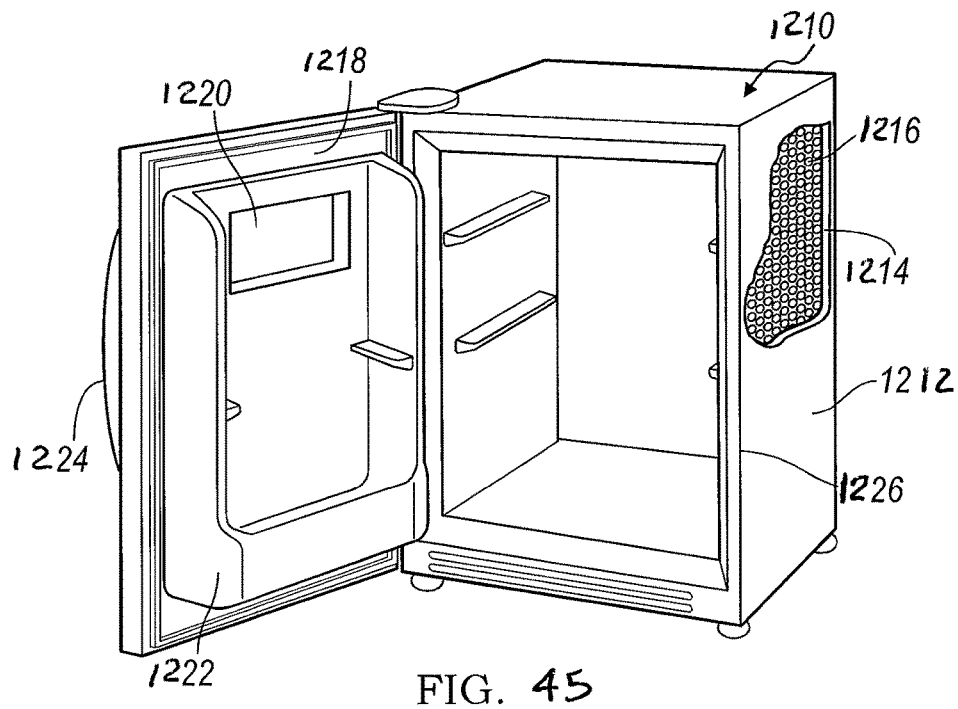
FIG. 45 schematically illustrates panels for a refrigerator system according to at least one embodiment.

FIG. 45 schematically illustrates a refrigerator 1210 having a panel 1212. Panel 1212 has a wall 1214 with a thermal bond (not shown) to an in-situ foam core 1216, according to at least one embodiment. In another embodiment, a door panel 1218 includes an inner surface having an embossment 1220 and a protrusion 1222 molded into at least one surface of door panel 1218. Attached to door panel 1218 is a refrigerator handle 1224 having a skin (not shown) and an in-situ foam core (not shown).

Figure 46:
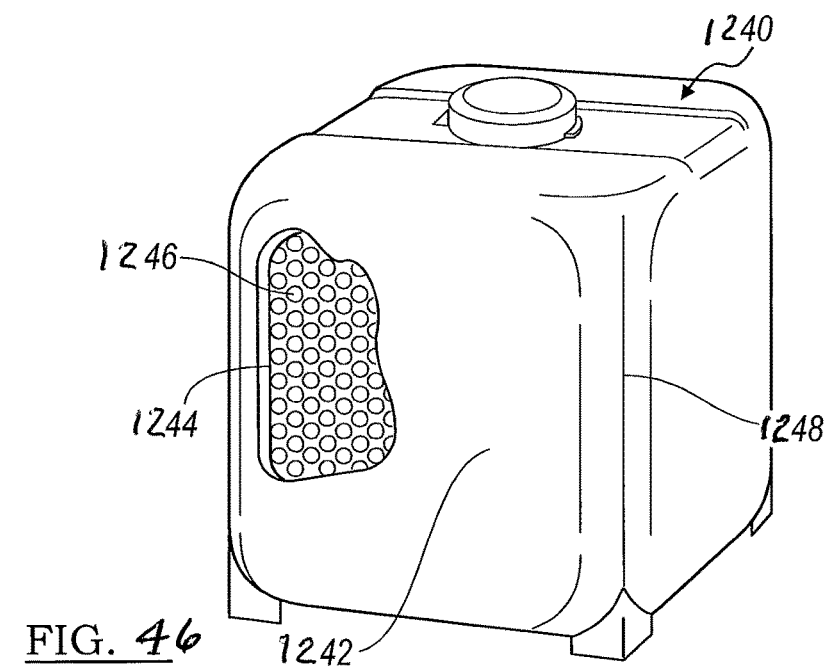
FIG. 46 schematically illustrates panels for a tote according to at least one embodiment.

FIG. 46 schematically illustrates a tote 1240 suitable for holding relatively high-temperature liquids, such as liquid asphalt, liquid malic acid, and molten sulfur, in at least one embodiment. Tote 1240, in another embodiment, is suitable for holding sub-ambient temperature liquids, such as liquid nitrogen, as well as refrigerated produce requiring temperature in the range from 0° C. to 4° C.

Figure 47:
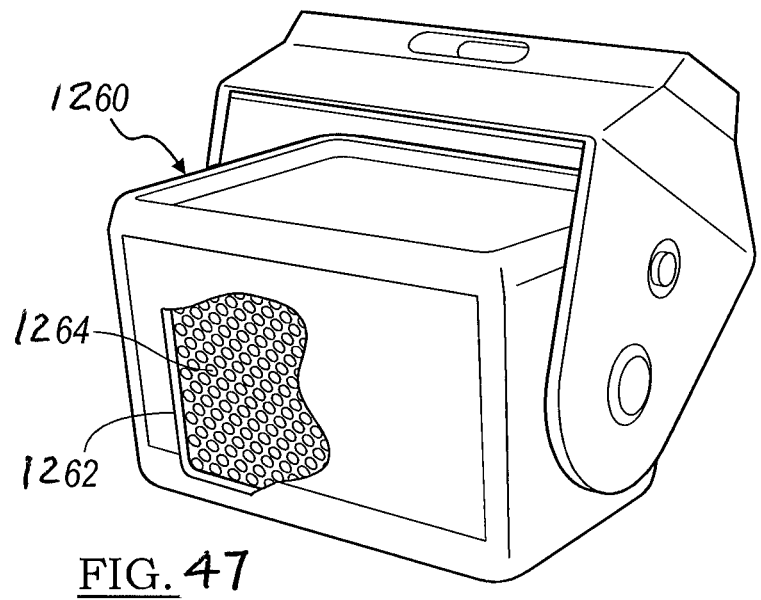
FIG. 47 schematically illustrates panels for a personal cooler according to at least one embodiment.

FIG. 47 schematically illustrates a personal cooler 1260 having a skin 1262 and an in-situ foam core 1264.

In-situ foam core 1232 is prepared by injecting steam into pre-expanded beads dispensed into cavity (not shown) defined by walls 1214 (FIG. 45), 1244 (FIG. 46), and/or 1262 (FIG. 47). It should be understood that the pre-expanded beads may have different original diameters and form, when fully expanded, in-situ foam cores 1216, 1246, and/or 1264, respectively.

Figure 48:
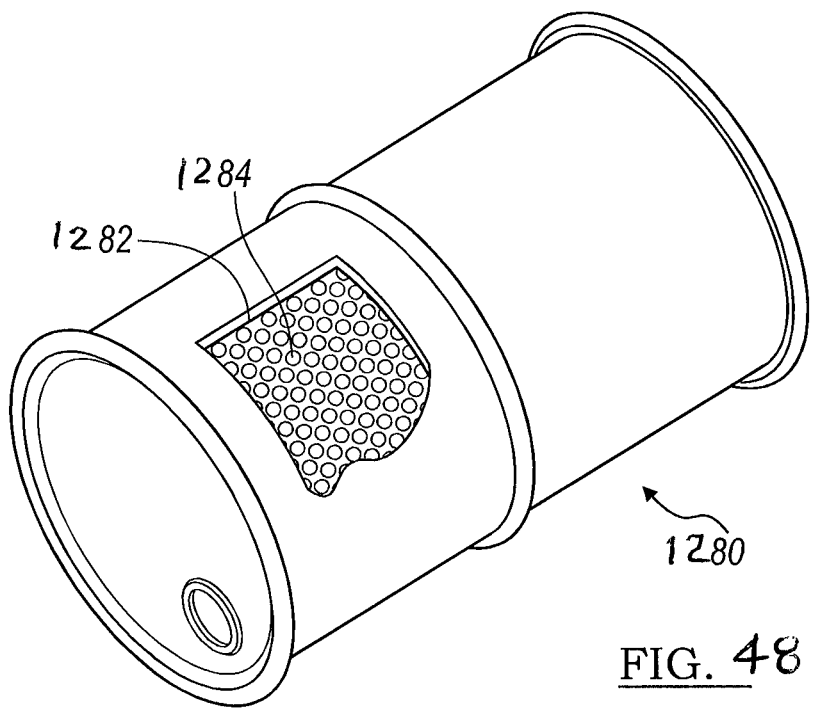
FIG. 48 schematically illustrates a beer keg according to at least one embodiment.

FIG. 48 schematically illustrates a beer keg 1280 according to at least one embodiment. Beer keg 1280 has a wall 1282 having a thermal bond to an in-situ foam core 1284. The light weight and durability of beer keg 1280 relative to a conventional aluminum beer keg are appreciated by customers. In addition, beer distributors appreciate that the expensive aluminum kegs that some users recycle for cash are replaced by beer keg 1280, for which recyclers pay relatively less cash.

Figure 49:
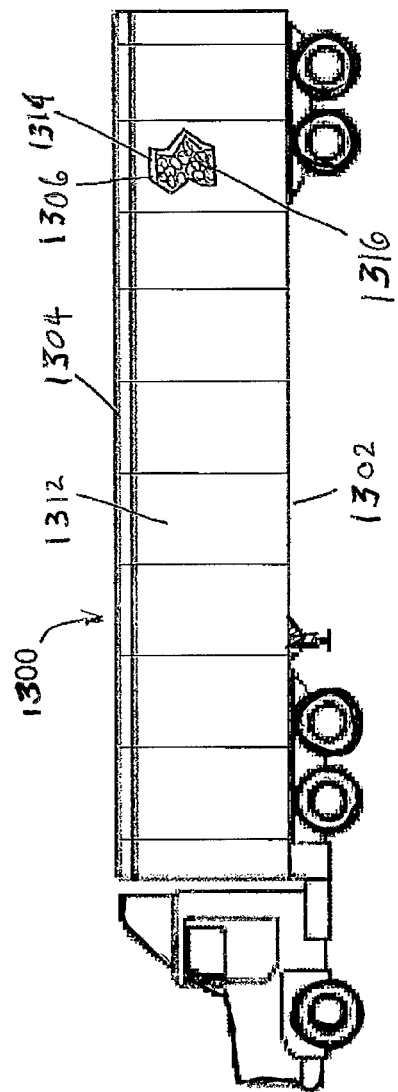
FIG. 49 schematically illustrates a refrigerated van for a semi-trailer according to at least one embodiment.

FIG. 49 schematically illustrates a semi-truck with a trailer 1300. Trailer 1300 is comprised of a plurality of panels 1312, according to at least one embodiment. Panels 1312, in at least one embodiment, are interlocked into a van floor 1302 and/or a van roof 1304. Panels 1312 have the wall 1314 with a thermal bond 1306 to the in-situ foam core 1316. Thermal bond 1306 includes a cooled member of a molten or softened portion of skin 1314, a molten or softened portion of in-situ foam core 1316, and a co-mingled layer of skin 1314 and in-situ foam core 1316.

In at least one embodiment, the wall 1314 thickness may range from 0.02 inches to 0.5 inches. In another embodiment, wall 1314 thickness may range from 0.125 inches to 0.25 inches.

In at least one embodiment, in-situ core 1316 thickness may range from 0.15 inches to 6 inches. In another embodiment, in-situ foam core 1316, thickness may range from 0.2 inches to 4 inches. In another embodiment, in-situ foam core 1316 thickness may range from 0.5 inches to 1 inch.

Walls 1314 in at least one embodiment, are formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, walls 1314 are formed of a composition of a thermoplastic polymer, a thermoset polymer, or blends thereof having a viscosity ranging from 0.1 grams/10 min. to 40 grams/10 min. The viscosity is measured according to ASTM D-1238 at 190° C. with a 2.16 kg weight. In yet another embodiment, walls 1314 are formed of a composition of a polyolefin including a polypropylene and polyethylene having a viscosity ranging from 1 grams/10 min. to 30 grams/10 min.

In-situ foam core 1316 in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene 1, and copolymers of ethylene or polypropylene with other polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polyactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core. In another embodiment, pre-expanded bead is the result of the first expansion step where raw bead is expanded from 25% to 90% of the fully-expanded bead size.

A fluid for the second expansion step of the two-step expansion process for beads causes the pre-expanded beads to expand completely to form the fully expanded beads. Examples of the fluid include, but are not limited to, steam and superheated steam.

In at least one embodiment, in-situ foam core 1316 density, after expansion by steam, ranges from 1 lb/ft$^3$ to 25 lbs/ft$^3$. In at least one embodiment, in-situ foam core 1316 density ranges from 1.5 lbs/ft$^3$ to 15 lbs/ft$^3$. In at least one embodiment, in-situ foam core 1316 density ranges from 2 lbs/ft$^3$ to 9 lbs/ft$^3$. In at least one embodiment, in-situ foam core 1316 density ranges from 3 lbs/ft$^3$ to 6 lbs/ft$^3$.

In at least one embodiment, walls 1314, with a range of 0.025 inch thickness to 0.1 inch thickness, are comprised of metallocene polypropylene. Such a combination is found to improve adhesion between walls 1314 and in-situ foam core from 1316 formed of EPP.

Refrigerator 1210, tote 1240, beer keg 1280, personal cooler 1260, and trailer 1300, in at least one embodiment, have thermal transmittance u-values ranging from 0.1 to 0.17 W/m$^{2\circ}$ C. In another embodiment, refrigerator 10, tote 1240, personal cooler 60, beer keg 80, and van 100 have thermal transmission u-values ranging from 0.12 to 0.16 W/m$^{2\circ}$ C.

Panel 1218 of refrigerator 1210 consolidates a number of individual components into one moldable unit providing a substantial cost improvement relative to current refrigerator construction methods.

Personal cooler 1260 consolidates two parts into one relative to current personal cooler construction methods, but also avoids the extra labor costs of the secondary operation for injecting polyurethane foam that is in use with current cooler construction methods. Further, personal cooler 1260 also avoids use of potentially destructive blowing agents relative to the environment.

It is understood that while refrigerator 1210, tote 1240, personal cooler 1260, beer keg 1280, and trailer 1300 are illustrated in embodiments, other similar structures, such as commercial ice making machine systems; chemical tank covers; hot tub covers, walls, and bases; liquid storage facilities for use at ports, including those with food-grade composition walls; and in-flight beverage carts are some non-limiting articles amenable to manufacture by this method.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a plastic structural article, the method comprising:

providing a bead reservoir containing expandable polymer beads maintained in a pressurized state above atmospheric pressure;

blow-molding a plastic preform in a mold cavity using compressed gas to form the preform into an elongated member comprising an at least partially formed elongated tubular plastic shell wall defining a hollow interior cavity;

extending a plurality of hollow pins to pierce and extend through the at least partially formed elongated tubular plastic shell wall, the plurality of hollow pins comprising a first group of the hollow pins and a second group of the hollow pins;

introducing a pressurized gas into the hollow interior cavity through at least one of the hollow pins so as to cause the elongated tubular plastic shell to fully conform to the mold cavity;

after said fully conforming of the elongated tubular plastic shell to the mold cavity, venting the hollow interior cavity to achieve a controlled reduction in cavity pressure to below that of the bead reservoir pressure;

cutting at least one fill port through the elongated tubular plastic shell wall while maintaining the mold cavity pressurized above atmospheric pressure during said controlled reduction in cavity pressure;

after the reduction to below the bead reservoir pressure, filling the hollow interior cavity with the expandable polymer beads maintained in the bead reservoir in the pressurized state by opening a bead fill valve coupling the mold cavity to the bead reservoir while further controlling the cavity pressure by regulating the flow of gas exiting the mold cavity so as to maintain the expandable polymer beads in a compressed state relative to atmospheric pressure while the cavity is being filled therewith;

injecting a hot, at least partially vaporized heating medium into the filled interior cavity through the first group of the hollow pins while removing the heating medium from the interior cavity through the second group of the hollow pins for a period of time and then injecting the hot, at least partially vaporized heating medium into the interior cavity through the second group of the hollow pins while removing the heating medium from the interior cavity through the first group of the hollow pins for a period of time so as to partially melt and expand the expandable polymer beads to substantially fill the interior cavity of the shell, in turn causing the beads to bond to one another and to the shell wall;

injecting air into the interior cavity through one of the two groups of the hollow pins while evacuating air and condensate formed by the heating medium from the interior cavity through the other of the two groups of the hollow pins for a period of time, and then injecting air into the interior cavity through the other of the two groups of the hollow pins while evacuating the air and condensate from the interior cavity through the one of the two groups of the hollow pins for a period of time so as to provide cooling to substantially limit further expansion of the expanded beads, in turn forming the plastic structural article; and releasing the plastic structural article from the mold cavity.

2. The method of claim 1, wherein the first and second groups of hollow pins are a part of at least three groups of the hollow pins, with each of the three groups connected to a common manifold which is alternatively connected to each of a source of the pressurized gas, a source of the at least partially vaporized heating medium, and a vent, the alternative connection enabling the shell cavity to be subjected to said sequential blowing, venting, heating, and cooling.

3. The method of claim 2, wherein the heating medium is hot steam.

4. The method of claim 1, further comprising the step of extruding the plastic preform in the shape of an elongate hollow tube prior to the blow-molding step.

5. The method of claim 1, wherein the step of cutting at least one fill port comprises cutting at least two fill ports.

6. The method of claim 5, wherein the step of filling the shell interior cavity with expandable polymer beads further comprises filling each of the two fill ports with expandable polymer beads having a different density from expandable polymer beads filled at the other of the two ports so as to provide the plastic structural article with at least two different density zones.

7. The method of claim 5, wherein the elongated member is elongated along a generally vertical axis and the at least two fill ports are vertically spaced apart along said vertical axis.

8. The method of claim 7, wherein the filling of the expandable beads is conducted in sequence from the lowest of the at least two vertically spaced fill ports to the highest of the at least two vertically spaced fill ports.

9. The method of claim 1, wherein during the step of filling the hollow interior cavity with expandable polymer beads the cavity pressure is maintained at approximately 5 PSIG below the bead reservoir pressure.

10. The method of claim 1, wherein the pressurized state of the bead reservoir pressure is maintained at about 30 PSIG + or −2 PSIG.

11. The method of claim 1, wherein:

the mold cavity is vertically elongated with the fill port located adjacent an upper end of the cavity, the first group of the hollow pins located in a lower region of the cavity, and the second group of the hollow pins located in a region of the cavity above the first group, and during the bead filling step, the cavity pressure is initially regulated for said maintenance of the expandable beads in the compressed state using the first group of the hollow pins with the second group of hollow pins closed, and once the lower cavity region is partially filled with the expandable polymer beads, the second group of hollow pins is opened so as to continue said maintaining of the expandable polymer beads in the compressed state during the filling step.

12. The method of claim 1, wherein said blow molding takes place at a cavity pressure of about 80-120 psig, said cutting takes place at a cavity pressure of approximately 30 psig, said filling takes place at a cavity pressure of approximately 25 psig, and the cavity is vented from said pressure of approximately 25 psig to atmospheric pressure after said filling of the expandable beads into the cavity so as to cause the expandable beads to expand in size and become slightly deformed as they contact one another prior to said injecting of heating medium.

13. The method of claim 1, wherein the elongated tubular plastic shell wall of the preform has opposed end sections and a middle section therebetween defining the hollow interior cavity.

* * * * *